(12) United States Patent
Goldman et al.

(10) Patent No.: US 8,739,016 B1
(45) Date of Patent: May 27, 2014

(54) ONTOLOGY MODELS FOR IDENTIFYING CONNECTIVITY BETWEEN ENTITIES IN A SOCIAL GRAPH

(75) Inventors: Neal Goldman, New York, NY (US); John C. Dingee, Bronxville, NY (US)

(73) Assignee: Relationship Science LLC, New York, NY (US)

( * ) Notice: Subject to any disclaimer, the term of this patent is extended or adjusted under 35 U.S.C. 154(b) by 255 days.

(21) Appl. No.: 13/236,602

(22) Filed: Sep. 19, 2011

Related U.S. Application Data

(60) Provisional application No. 61/507,106, filed on Jul. 12, 2011.

(51) Int. Cl.
*G06F 17/00* (2006.01)

(52) U.S. Cl.
USPC .......................................................... 715/200

(58) Field of Classification Search
USPC .......................................... 715/200, 205, 255
See application file for complete search history.

(56) References Cited

U.S. PATENT DOCUMENTS

| | | | | |
|---|---|---|---|---|
| 7,530,105 | B2 * | 5/2009 | Gilbert et al. | 726/22 |
| 8,060,885 | B2 * | 11/2011 | Benedetti et al. | 718/104 |
| 8,072,954 | B2 * | 12/2011 | Shen et al. | 370/338 |
| 8,185,558 | B1 | 5/2012 | Narayanan et al. | |
| 8,386,482 | B2 | 2/2013 | Gopalakrishnan | |
| 8,443,005 | B1 * | 5/2013 | Goldman et al. | 707/798 |
| 8,583,659 | B1 * | 11/2013 | Alexandrescu et al. | 707/748 |
| 2004/0054690 | A1 * | 3/2004 | Hillerbrand et al. | 707/104.1 |
| 2006/0020886 | A1 | 1/2006 | Agrawal et al. | |
| 2006/0075335 | A1 | 4/2006 | Gloor | |
| 2007/0124291 | A1 | 5/2007 | Hassan et al. | |
| 2008/0071796 | A1 | 3/2008 | Ghuneim et al. | |
| 2008/0086343 | A1 | 4/2008 | Pendergraft et al. | |
| 2009/0228296 | A1 | 9/2009 | Ismalon | |
| 2009/0313041 | A1 | 12/2009 | Eder | |
| 2010/0082695 | A1 | 4/2010 | Hardt | |
| 2010/0268719 | A1 | 10/2010 | Cormode et al. | |
| 2010/0274815 | A1 | 10/2010 | Vanasco | |
| 2011/0004692 | A1 | 1/2011 | Occhino et al. | |
| 2011/0022388 | A1 * | 1/2011 | Wu et al. | 704/246 |
| 2011/0035202 | A1 * | 2/2011 | Quinn et al. | 703/13 |
| 2011/0055186 | A1 | 3/2011 | Gopalakrishnan | |
| 2011/0208822 | A1 * | 8/2011 | Rathod | 709/206 |
| 2012/0079023 | A1 | 3/2012 | Tejada-Gamero et al. | |
| 2012/0158499 | A1 * | 6/2012 | Banadaki et al. | 705/14.52 |
| 2012/0158633 | A1 | 6/2012 | Eder | |
| 2012/0166348 | A1 | 6/2012 | Dyagilev et al. | |
| 2012/0210247 | A1 * | 8/2012 | Khouri et al. | 715/751 |
| 2012/0232998 | A1 * | 9/2012 | Schoen | 705/14.66 |
| 2012/0278625 | A1 * | 11/2012 | Narayanan et al. | 713/175 |

(Continued)

OTHER PUBLICATIONS

Wand et al., An Ontological Analysis of the Relationship Construct in Conceptual Modeling, ACM 1999, pp. 494-528.*

(Continued)

*Primary Examiner* — Cong-Lac Huynh
(74) *Attorney, Agent, or Firm* — Aka Chan LLP

(57) ABSTRACT

A system gathers information on important and influential people and uses an ontology to build a social graph. The information is organized based on this social graph and provided to users as a service. The system uses ontology models to identify connectivity between entities (e.g., people, organizations, events, and things) in the social graph. Through its ontology, the system can determine, interpret, and represent the relationships of people that occur in the real world.

33 Claims, 32 Drawing Sheets

(56) References Cited

U.S. PATENT DOCUMENTS

| | | | |
|---|---|---|---|
| 2012/0284282 A9 | 11/2012 | Ghosh et al. | |
| 2012/0317088 A1 | 12/2012 | Pantel et al. | |
| 2012/0317121 A1 | 12/2012 | Fuchs et al. | |
| 2012/0331049 A1* | 12/2012 | Deeter et al. | 709/204 |
| 2013/0019262 A1 | 1/2013 | Bhatia et al. | |
| 2013/0054604 A1* | 2/2013 | Boldyrev et al. | 707/739 |
| 2013/0080225 A1* | 3/2013 | Rajaram | 705/14.16 |
| 2013/0097056 A1* | 4/2013 | Sun et al. | 705/26.35 |
| 2013/0173520 A1* | 7/2013 | Clemencon et al. | 706/46 |
| 2013/0173633 A1* | 7/2013 | Piepgrass et al. | 707/748 |
| 2013/0191416 A1* | 7/2013 | Lee et al. | 707/771 |
| 2013/0204710 A1* | 8/2013 | Boland et al. | 705/14.66 |
| 2013/0226859 A1* | 8/2013 | Hatami-Hanza, Hamid | 706/52 |
| 2013/0227011 A1* | 8/2013 | Sharma et al. | 709/204 |
| 2013/0268973 A1* | 10/2013 | Archibong et al. | 725/51 |

OTHER PUBLICATIONS

Rafelsberger et al., Games with a Purpose for Social Networking Platforms, ACM 2009, pp. 193-197.*

Laclavik et al., Use of Email Social Networks for Enterprise Benefit, IEEE 2010, pp. 1-4.*
Sacco et al., A Privacy Preference Ontology (PPO) for Linked Data, Google 2011, pp. 1-5.*
Kurki et al. Authority Control of People and Organizations on the Semantic Web, Google 2009, pp. 1-15.*
B. Aleman-Meza et al., "Semantic Analytics on Social Networks: Experiences in Addressing the Problem of Conflict of Interest Detection," World Wide Web Conference Committee (IW3C2), WWW 2006, May 23-26, 2006, Scotland, pp. 407-416.
Ehrlich et al., "Inside Social Network Analysis", Boston College, 2005, 13 pages.
"Server definition," The Linux Information Project, created May 16, 2005, retrieved Jan. 23, 2013 from http://www.linfo.org/server.html, one page.
Wand et al., "An Ontological Analysis of the Relationship Construct in Conceptual Modeling," ACM 1999, pp. 494-528.
Rafelsberger et al., "Games with a Purpose for Social Networking Platforms," ACM 2009, pp. 193-197.
Laclavik et al., "Use of Email Social Networks for Enterprise Benefit," IEEE 2010, pp. 1-4.

* cited by examiner

ONTOLOGY MODELS FOR IDENTIFYING CONNECTIVITY BETWEEN ENTITIES IN A SOCIAL GRAPH

CROSS-REFERENCE TO RELATED APPLICATIONS

This patent application claims the benefit of U.S. provisional patent application 61/507,106, filed Jul. 12, 2011, which is incorporated by reference along with all other references cited in this application.

BACKGROUND OF THE INVENTION

The present invention relates to the field of information management, and more specifically, to providing an information resource where the content is organized using a social graph based on ontology models.

In business, there is an adage: "the right ten minutes in front of the right person is worth more than a year at your desk." This is because it is people that make things happen, and connecting with the right person can give you the resources, access or credibility you may need to advance your business.

So, often the questions become who is the right person, how do I get in front of them, and how do I "emotionally connect" with them in the first few minutes so that they take a liking to me, listen to the rest of my presentation, and want to help me.

Most business people are constantly trying to advance their career by creating the "right" relationships. It is a complicated task figuring out who those people are, meeting them, and building a relationship. Each of these is a specific task.

Most executives try to "do their homework" in this regard. For instance: (1) I am going to a conference: who do I want to meet there and what should I say if I meet them? (2) I am going to a meeting: I know who the other people are going to be in attendance, but what can I know about them to make my meeting more successful? (3) I want to meet someone: who do I know who can introduce me? (4) I want to get someone as a client: how do I sound knowledgeable about their particular lives and issues to demonstrate sensitivity to their concerns? There are many more such use cases.

Some social networks include Facebook™ and LinkedIn™. Trademarks indicated in this patent application are the property of their respective owners. If the world is a pyramid of people, with the "most important" being at the top, Facebook is the masses at the bottom and LinkedIn is the middle-level managers in the middle. However, there is no social network that caters to the world's most "influential people," in large part because these people generally keep a low profile, do not promote themselves, and generally do not want the general public contacting through electronic means.

On-line services, libraries, and information resources are available to assist users to research people (often important and influential) that they want to make a connection to. The information is, however, typically presented in a flat format. Even if hyperlinked, the information is still not presented in a way to easily show connections between a targeted individual and other people, and how the targeted individual might be connected to the user.

Therefore, there is a need to provide an information resource where information is also organized according to a social graph or social network, which shows the connections between people, especially influential people.

BRIEF SUMMARY OF THE INVENTION

A system gathers information on important and influential people and builds a social graph. The information is organized based on this social graph and provided to users as a service. The system has an ontology and analytics to organize the people according to their overall power or influence (which can be called a influence index value) as well as their influence in a particular domain, relationships to other people or organizations, influence over others, indirect influences, and more. Users can enter as nodes in the social graph to explore potential relationships and commonalities with the influential people. Connectivity information in the social graph and databases are continually updated as new news and information becomes available. Users can request and receive reports on people of interest as information is updated.

The system creates an extensive database and technology product that tracks the most important or influential people in the United States and in the world. There are an estimated one and a half million very important and influential people in the U.S. and the world, and the system can track these people and more. The system is scalable to track increasing numbers of people and also people in additional geographic areas.

In an implementation, the system is not a social network like Facebook or MySpace. Users or subscribers of the system are not asked to contribute any data, but the users can provide information about themselves so the system can determine any links they might have to the people being tracked. The system uses a vast array of publicly available data sources, both on-line and not on-line, to create deep and rich profiles on people—their business life, their personal life and who they know. This is not just who these people know in a business context, but who are their friends and others who have "real world" influence over them (and vice versa).

In additional to "important" people, there are some very key hubs of connectivity and influence. For instance, a well-respected divorce attorney who has developed very close relationships with his or her clients over the years, can potentially be a powerful connector in society. The information on who they know can be valuable to a user. In another example, relationships of a respected person running a well-respected nonprofit is tracked. This person may know large donors (who themselves are very important) to the nonprofit.

Additionally, the system allows subscribers (such as people who pay a monthly fee to access to the system through the Internet) to create their own profile. The system can include for example, where they went to school, where they worked, what types of nonprofit interests they have, clubs they belong to, where they grew up, and who they know. In an implementation, this profile is not seen by any other user or subscriber of the system. The profile may be protected and not shown to others unless explicitly granted permission, but allows the system to customize itself to the user. So, if a subscriber pulled up the profile of an important person they would immediately see "who do I know in common with this person" and "what other interests or facts do I share in common with this person." In essence, the system can do the work of telling a user how to get to anyone and what to say to them to bond with the person within a few minutes. There are many applications for the system and some examples are described below.

Most executives do some version of this work already. They do Google searches (or have their assistant do it), which returns a very verbose, spotty, incomplete, and unsynthesized view of a person. Then, they have to read it all to try and understand how they might relate to the person. This costs time and money and is very inefficient. The system makes this information available more easily.

The system uses an ontology to represent the connections and information of the system. Ontology is the study of being, the basic categories of beings and their relations with one another. The study has it's roots in ancient Greek philosophy as a branch of metaphysics. Ontology as a discipline is the study of things in the universe, but an ontology from the perspective of computer science and database design is the way that system defines the world; that is, what is a "thing," what constitutes a "relation." The system can use ontology defined by a collection of "Reference Data Tables." Each record in the database is referred to by at least one reference data point, and it is these set of tables and values that defines the ontology in the system.

In another implementation, the system uses "Validation Tables" in addition to reference data tables. These tables validate records in the database based upon reference data values and assists the system to determine "how do we know what we know?" Having validation in the database allows us to be confident that all of the data that is stored in the system is consistent with business rules and the ontology of the system.

In an implementation, a method includes: crawling a network of unstructured information data sources to obtain information; filtering the information according to an ontology data model to create ontology data structures; storing the ontology data structures on a server; building a social graph based on the ontology data structures, where the social graph comprises system-provided nodes and system-provided edges that link the nodes, and a node is at one or more degrees of separation from other nodes; and providing a graphical user interface through which users can access information stored in the social graph based on the ontology data structures.

In an implementation, a method includes: receiving unstructured information; and providing an ontology data model with entity types and relationship types, where the relationship types are used to interconnect the entity types. Based on the ontology data model, ontology data structures are created including: identifying a first portion of the unstructured information as a first entity type; identifying a second portion of the unstructured information as a second entity type; and assigning a first relationship type to interconnect the first and second entity types.

The ontology data structures are stored on a server. For example, the data structures can be stored in a database, magnetic disk, optical disk, or other, or combinations of these. The method includes: updating a social graph with the ontology data structures, where the social graph includes system-provided nodes and system-provided edges that link the nodes, and a node is at one or more degrees of separation from other nodes; and providing a graphical user interface through which users can access information stored in the social graph with the ontology data structures.

In an implementation, a method includes: providing a predefined ontology data model; filtering (e.g., parsing, analyzing, or syntactic analysis) through information using the predefined ontology data model to obtain ontology data structures including entity types and relationship types that interconnect the entity types; and providing the entity types as system-provided nodes of an information service accessible by users. For example, users can be subscribers that access the system by logging into the system via a Web interface.

The system-provided nodes, ontology data structures, and connectivity information between the system-provided nodes are stored using a computer. This information can be stored in nonvolatile memory, so that it can retrieved multiple times (even after a power outage). At certain times, portions may be stored also in volatile memory (such as RAM or cache). Users are permitted to view, through a computer graphical user interface (e.g., Web interface or application executing on a smartphone), connectivity information on the system-provided nodes.

For the system, parsing, or more formally, syntactic analysis, is a process of analyzing text or similar information. For example, the text may include a natural language description (e.g., unstructured or unfiltered or unprocessed information received from the Internet). In order to build and update the social graph, the system maps this information to the ontology models of the invention. In a specific implementation, the text is analyzed and mapped to tokens or sequence of tokens (or similar data structures) representing concepts of the ontology. The application describes various tables and ontology models used by the system to determine, interpret, and represent the relationships of people in the real world. Through its ontology, the system presents a computer representation of real-world relationships. Users of the system can view this computer representation through a graphical user interface.

In an implementation, the system's ontology data models are defined (or predefined) before the information that is being processed. For example, this ontology data model may be considered static. However, in other implementations, the ontology data model may be dynamic and include ontology structures that are defined or added after the information has been received. For example, after processing, the system can suggest additions or extensions to the ontology models to handle new information (e.g., with many occurrences or something having many connections to many entities). With the ontology model additions, the system will model real-world relationships even better.

Other objects, features, and advantages of the invention will become apparent upon consideration of the following detailed description and the accompanying drawings, in which like reference designations represent like features throughout the figures.

DETAILED DESCRIPTION OF THE INVENTION

Figure 1:
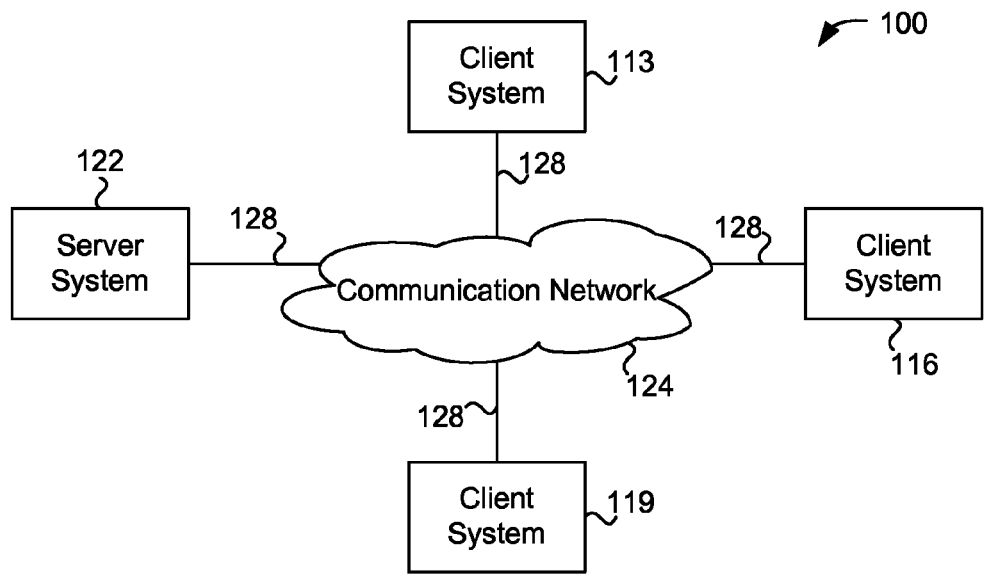
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
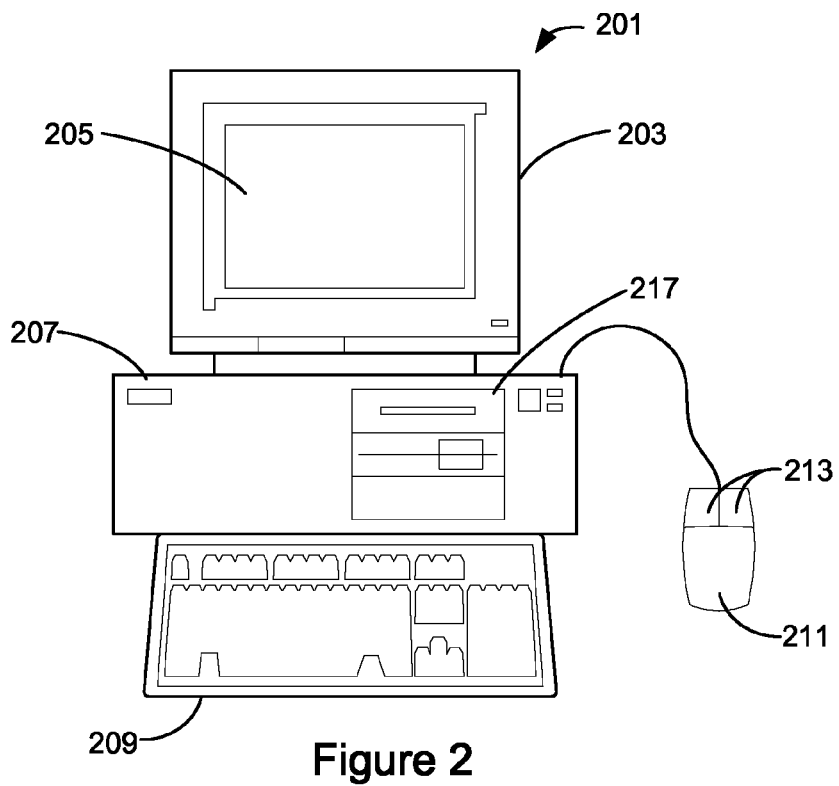
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
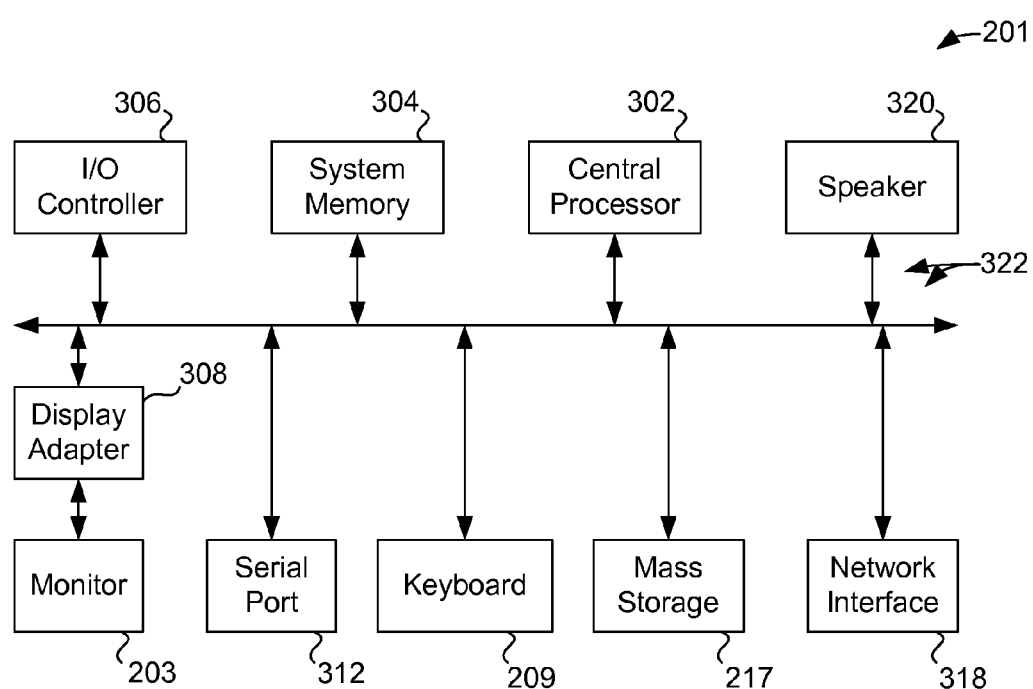
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64×2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

Note that the system captures certain types of relationship information (and many derivatives thereto) that have never been previously captured electronically. For example, there is no publicly available database in the world that has recorded who someone's best friend is. Or that two people were reported in page six of the news paper as having lunch together. Or what elementary school a particular executive sends his or her children, what grade they are in, what other powerful people have children in the same class, and which parents from that class donated the most money. In an implementation, the system can use the ontology, weighted path algorithms, and centrality algorithm to estimate the probability that two people know each other. The probability function is based on, amongst other things, how much influence these people have over one another, the difference of these two values, the sectors in which these two people have influence, and the influence they have in those sectors. In an implementation, given the default weight of a particular predicate, the probability is one-hundred percent that two people know each other. For example, if the relationship between person A and person B is "mother" the system determines that these two people know each other.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

Figure 4:
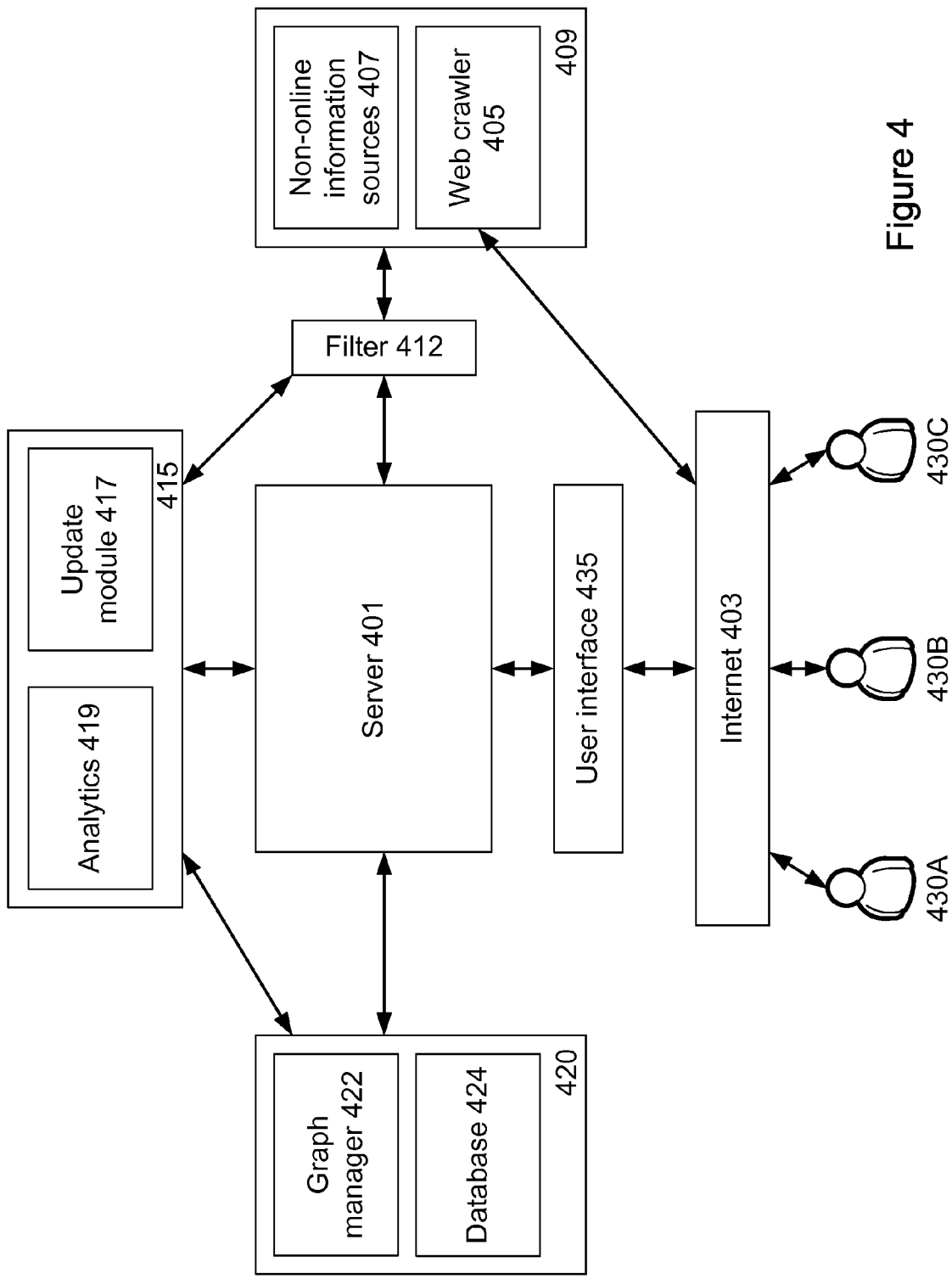
FIG. 4 shows a system diagram where information is filtered to obtain structured information based on ontology models to build and update a social graph.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph of the system.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node does not interact or interfere with other ghost nodes for other users of the system.

In an implementation, every piece of information is attributed with a "type." The type system is our ontology as information is broken down into a few major categories that organize different types of data. Entity Types classify each entity, or node in the graph at the top level. Each Entity in the system can be categorized at very granular levels, and have multiple classifications, however, each entity must have exactly one top level type. In an implementation, an organization is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

In another implementation, not all persons are represented as a person node. For example, some organizations can have many members or people. Using the example given in the previous paragraph, if there is a person C who is an entry-level associate at company A, the system does not need to create a person node to represent person C. Instead, person C can be associated with the organization without a separate person node. This simplifies and reduces the information the system needs to store.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, a 0-1 Score of a particular entity's influence over another is calculated on the fly with our weighted path algorithm, as discussed in further detail below. This score may be the result of a function based on: (1) Predicate (Type of Relationship); (2) Time (e.g., Recency, Length of time); (3) Amount of Incoming links of the same predicate, or (4) An array of Attribute value pairs are based on the system's ontology and can modify the weight-in/weight-out of the edge. This includes all of the paths throughout the graph that link those two entities together.

In another implementation, the ontology of the system is represented by two separate Ontologies which are referenced throughout the system's data set in a number of concepts. These type systems are, for example, Concepts Graph, and Type System. The Type System is represented by six separate systems which have different applications and different significance: Entity Classifications, Entity Attributes, Relationship Types (e.g., Edge Labels), and Relationship Attributes, Entity Attribute Values, Relationship Attribute Values.

Entities are categorized in the "Entity Classifications" partition of the type system. Each value in the entity classification can be linked to any entity in the graph via the "Type Of" Edge. Each node (or vertex) in the graph will be linked to at least one classification.

In an implementation, the system links interests as concepts in the concepts ontology. This allows us to connect people having similar interests while not having the exact same interest. For example, we could connect the node for "Biking" to the node of "Running" with a "Related Interest" edge.

In an implementation, the direction of a particular relationship type or edge label is defined in the "Relationship Types" system. A directed edge has a name and an inverse name, and different values for the default in/out weights. A bi-directional edge has a NULL inverse name and has the same value for weight-in/weight-out. Some relationships, such as a friendship, have no direction, since the relationship means the same in both directions. A direction is useful for representing other relationships, such as a father or employee, since directed relationships have inverses. A fixed weight is used to calculate all relationships of a specific type. A fixed weight is associated with the inverse relationship (if is directed), else the weight in weight out values will be the same.

In an example, consider the following relationships: Dave is Chris' friend and Dave is Chris' boss. Dave has a certain amount of influence over Chris, and Chris has a certain amount of influence over Dave (albeit less). In the first relationship, the relationship has no direction, that is "friend" means the same thing if you where to swap out Dave and Chris in that sentence. In the second relationship, the relationship implies a particular direction. The same predicate (or relationship type) is not the same when the entities are swapped. The system uses the direction of a relationship to derive influence metrics. Other metrics includes size of the group, length, seriousness (board subcommittee for instance), recency, and duration. This can be extended to companies. A CEO has a certain amount of influence over a company, and most certainly the company has influence over him.

In an implementation, influence is determined in two ways by two master algorithms. These algorithms determine the influence that two entities in the graph have over each other and one entity's influence in the world. This includes:

1. A person's influence in the world (their centrality in the graph).
2. A person's influence over a particular person.
3. A person's influence in a particular sector.
4. A person's influence over other types of entities (e.g., person, organization, creative work, field of study).
5. A person's influence over a concept (e.g., the most influential people in Mathematics). In an implementation, a centrality algorithm is used. The centrality algorithm determines a person's overall influence in the world, which is a function of their influence over the people they know, and how powerful those people are. The more powerful people (quantity and quality) you know (the better), the more powerful you are.

In yet another implementation, the centrality algorithm uses sign posts. This is a sort of bias on the centrality algorithm to operate with the assumption that this entity has a higher or lower weight then it would usually have if the algorithm were to be run with no bias. When the weight of one entity starts off with a bias, it effects the weights of all other entities and ripples through the entire graph. In order to ground the weighting mechanism of the system, and to get started in calculating influence, the system uses some Educated guesses (e.g., initial values) for some people. Having that weight allows us to calculate the weights of the entities surrounding them in the graph. Sign posts are not only used to bias the overall influence on one person in the master graph, they can also be used to bias their influence in a sector (or concept). In an implementation, sign posts are used in a concept by attaching edges from relevant nodes to a concept node. A bias can be applied to a node connected to the concept. Once the bias is applied, the effects of the bias can propagate through to other nodes connected to the concept (e.g., adding weights to edges connected to the concept).

For example, providing President Barack Obama an influence of 1.0. It is fair to say that anyone who has influence over President Obama, has influence in the world. Since we know this weight, we can start to calculate the influence of the people that surround him and others by how closely they are associated with him. See further discussion of signposts elsewhere in the application.

The system calculates the distribution of energy (or weight) in the graph but instead of having each node start with the same value, the system staggers it by hard coding influence metrics for a particular set of entities. This allows the function to feed off of itself.

In an implementation, weighted path algorithms are used to determine influence. For example, person-to-person influence can be determined according to: a particular relationship type (a predefined constant); the amount of direct and indirect relationships between two nodes; the influence of those incoming and outgoing links and time (duration and recency). In a simple form of the weighted path algorithm, two people who are on the subcommittees of the board for two public companies (e.g., small groups that are important and meet often) for the last five years (such that they have many meetings and discussions over time) have a stronger relationship that two people that were on a large (50 person) nonprofit board 10 years ago.

In yet another implementation, a person's influence over a non person entity can be determined. This non-person entity can vary from a company to a film. Influence is calculated per instance based on, for example, relationship type (e.g., Board Member), time, size of company, or others with influence. Additionally, there is the concept of influence over others with influence over the organization).

In an implementation to gather overall influence of a person, the summation (a simplified version of the function used as an example) of the relationship instances or paths between two nodes is calculated. Meaning if someone is the founder, and the CEO, those two different relationships have different weights independently. The summation of these two relationships, or edges, gives us the overall influence that one entity has over another.

In an implementation, an entity can have pass through (or indirect) influence to another entity. An example is that a person who has influence over Obama means that person is influential in the world. Another example is a private equity executive's influence over one of the firm's portfolio companies. In a specific example, Phoebe Phillips is the CEO of Hoode Partners she has a certain Influence over the firm. Since Hoode Partners owns a portion of CeeCee's Shoes Hoode Partners has influence over CeeCee's Shoes as well as the CEO of the company. This means that Phoebe Phillips has some quantifiable influence over CeeCee's Shoes. This is transitive (or pass through) influence.

In an implementation, the weighted path algorithm calculates the weighted paths between two nodes. Those two nodes could be the combination of any two types of node that exists in the ontology. For example, these can be:

(1) [Person]-to-[Person],
(2) [Person]-to-[Organization],
(3) [Person]-to-[Industry], or
(4) [Person]-to-[Concept].

In an implementation, one user's node is a ghost to every other node in the system. Thus, a piece of data added by a user will have no relevance to another user. However, for groups of users, say a small venture capital firm, the system allows a group of people to enter their contacts that are shared. This means that instead of just one node being the center of the universe for a user, the group of people in the firm are at the center. The value of the product increases tremendously by this sharing because it allows the users to plug-in to the database with a larger core. By interacting with friends and colleagues the connection possibilities increase dramatically.

The application has generated a set of distinct paths for two users, and by sharing contacts, now each user can see, and interact with each other's path to power.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node.

In another implementation, a system-provided node is a node created by a person other than the person represented by the node. For example, if Person A is a person represented by a system-provided node, a person other than Person A creates the node. In another example, where an Organization A is represented by a system-provided node, a person who is not a member of Organization A creates the node. In an implementation, the user is denied access to editing a system-provided node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

This application incorporates by reference U.S. patent application Ser. Nos. 13/224,110, 13/224,117, 13/224,119, 13/224,138, and 13/224,149, all filed Sep. 1, 2011, and 13/225,377 and 13/225,380, both filed Sep. 2, 2011.

In an implementation, data of the system is kept in two methods. A first method is a relational database that can be queried (e.g., structured query language or SQL). The system can also use any other structured relational database model built for efficient storage and optimized for data entry applications. A second method is a graph. The graph is designed to find relationship paths between profiled people in the system and the end user. The graph is also used to calculate influence metrics. The end user application can process information from the graph. Despite the differences in the structure of these two data structures, they are both based on the same ontology.

In an implementation, an ontology of the system is based on a set of master types. These master types can include: people, organizations, creative works, events, awards, places, addresses, building/structures, product/brands, transactions, and complex relationship entities. Each entity in the system is one of these master types, and can optionally include n more granular classifications associated with its master type.

In an implementation, entities in the system are stored in a relational database and in a graph. The entities can be referred to as "nodes" or "vertices." These entities are linked to each other through "relationships" or "edges." Each edge has a corresponding weight-out/weight-in corresponding to the influence one entity has over another for that particular relationship instance.

In an implementation, entities and relationships are classified via reference data. For example, entities can be classified by "Entity Type" and "Entity Classification," and relationships can be classified by "Relationship Type."

In yet another implementation, the system can define properties to nodes or edges. Properties are added to nodes and edges as attribute value pairs on both nodes and edges. Both attributes and corresponding values are defined in the ontology.

In an implementation, relationships (as represented by edges) of the system have multiple entities. Ideally, relationships of the system always involves exactly two entities. However, relationships in the real-world are not all binary and often involve three or more entities. For example, consider "Person A won Award B for their performance in movie C." This sentence involves three entities, and it is difficult to represent as a binary relationship. An example is that the system can decide: A won B, and A acted in C. But the system would not know that the two were related, so the system would not know: "A won B for C."

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figures 5A, 5B:
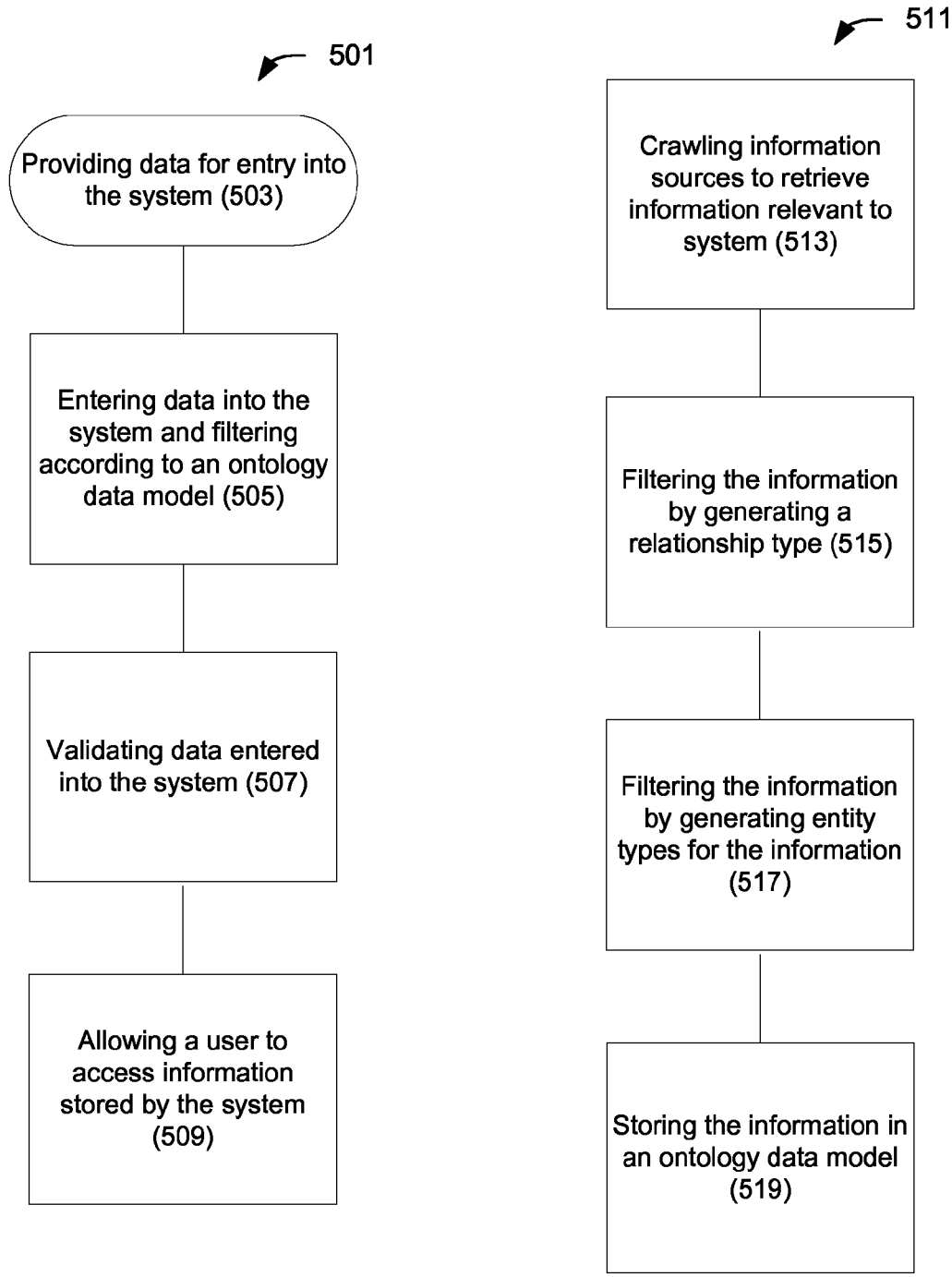
FIG. 5A shows a flow for using an ontology model to enter and validate information for the system.
FIG. 5B shows a flow for determining entity and relationship types of an ontology model.

FIG. 5A shows a sample flow of the system. In a step 503 of a flow 501, the system is provided data for entry into the system. For example, the data is information obtained by the system when crawling an electronic data source, identifies information relevant to the system, and extracts the information. In an implementation, information relevant to the system is information that relates to one or more system-provided nodes of the system.

In an implementation, the system searches for and retrieves unfiltered (or unstructured) information. Unfiltered information is information that has not been altered from its original state. For example, if the unfiltered information is a news article, the news article is retrieved in its entirety. After retrieving the unfiltered information, the system processes or filters the information in a format usable or storable by the system. For example, information from the news article (e.g., persons involved, event that occurred, location) is extracted.

In a step 505, the data is stored in the system. In an implementation, as discussed elsewhere in this document, the data is stored in a relational database of the system. In a step 507, the data is validated. In a step 509, the system allows a user to access the information stored by the system. The data accessed can be processed data. For example, the processed data is no longer the unfiltered data from step 503. Processing has been done on the data, so that the new data is connected to other data in the system that was previously not apparent.

FIG. 5B shows another flow of the system. In an implementation, this flow further specifies step 503 of flow 501. In a step 513 of flow 511, the system crawls information sources to retrieve information relevant to the system. In a step 515, the system filters the information by generating a relationship type. In a step 517, the system filters the information by determining a first piece of information and a second piece of information associated with the relationship type and assigning them entity types. For example, for a movie star in a movie, the relation type will be a "Was Actor In" and there is a person entity representing the actor and a creative work entity representing the movie. In a step 519, the system stores the information in an ontology data model.

Figures 6, 7:
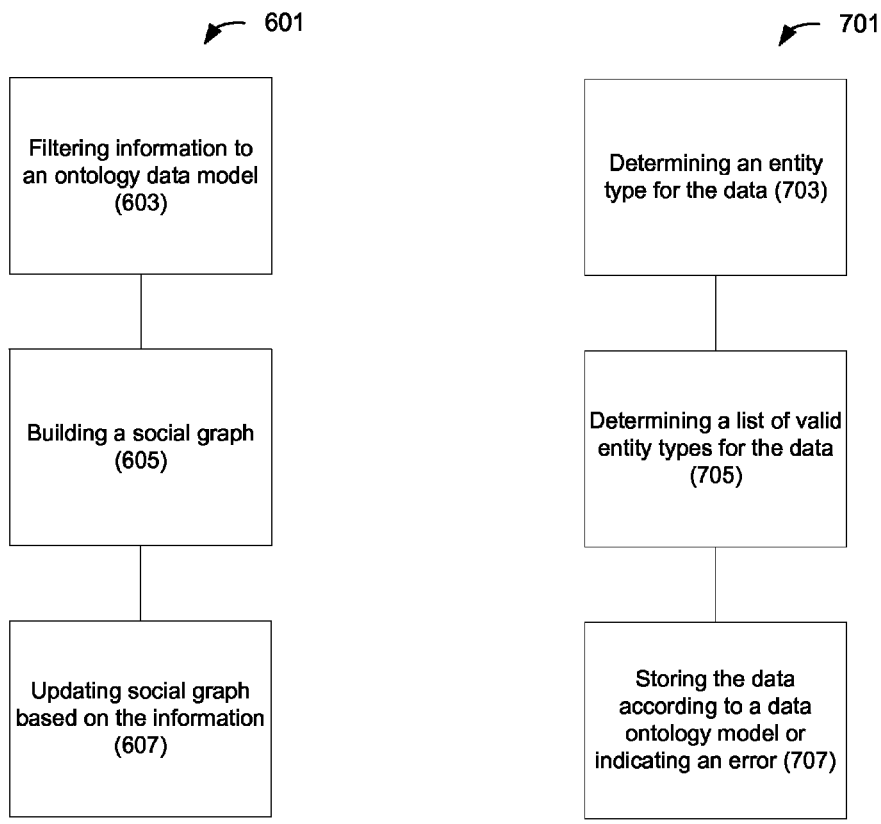
FIG. 6 shows a flow for using an ontology model to build and update a social graph.
FIG. 7 shows a flow for validating an entity type of an ontology model.

FIG. 6 shows another flow of the system. In an implementation, this flow further specifies step 505 of flow 501. In a step 603 of flow 601, the system filters the information to an ontology data model. Ontology data models are described in greater detail in this application, and includes definitions on what relationship types and entity types are possible for a given edge between system-provided nodes of the system. In a step 605, the system builds a social graph. In a step 607, the social graph of the system is updated based on the data. For example, the system creates a new edge between system-provided nodes of the social graph of the system with the relationship type determined in step 605.

FIG. 7 shows yet another flow of the system. In an implementation, this flow further specifies step 507 of flow 501. In a step 703 of flow 701, the system determines an entity type for the data. This can include selecting a data model. For example, the system accesses a data model store, where data models of the system are defined. In an implementation, the data models (or ontology data models) in the system are stored separately from the data itself. In a step 705, the system determines a list of valid entity types for the data. For example, this information can be stored in a separate validation table. The validation table contains the valid entity types for relationship types of the system, as is discussed in greater detail elsewhere in this document. In a step 707, the system either stores information or indicates an error based on the validation table.

In order to represent n-ary relationships, where n is an integer representing how many entities are involved in a relationship, the system created a data model that connects entities to relationships. To keep the system's data clean and intact, the system creates nodes or entities for particular relationships to which we want to attach other entities. In computer science and metaphysics, this is referred to as "reification," which literally means making something a thing. Given particular use cases, the system reify relationships, changing an edge to a vertex, allowing us to associate that vertex with other things. For the example given in the previous paragraph, the following entities are used: one film, one person, one award, and one film performance. This is represented in tables 1 and 2.

TABLE 1

Entities Table

| ID | Name |
|----|------|
| 1 | Person A |
| 2 | Award B |
| 3 | Film C |
| 4 | A's Performance in C |

TABLE 2

Relationships Table

| ID | E_1 | Relationship Type | E_2 |
|----|-----|-------------------|-----|
| 1 | Person A | Was Actor in | A's Performance in C |
| 2 | Film C | Was Film In | A's Performance in C |
| 3 | Award B | Awarded for | A's Performance in C |

In this example, reified edges are of entity type "Complex Relationship Entity." This design allows for extreme flexibility in the way the system models interactions. Based on the use cases that the system encounters, the system has the flexibility of defining a particular relationship as complex relationship if that relationship is something that links together other nodes in the graphs.

In an implementation, the system can determine the weight of relationships in the system. In order to determine the weights when traversing a complex relationship entity, the weight-in of a entity's relationship to a complex entity is always 1. This way, the weight-out of another side of the relationship will always be the weight that entity has on the entity on the other side of the complex entity. For example, this is shown in table 3 below.

TABLE 3

| Rel | Weight-out (or Wt-out) | Weight-in (or Wt-in) |
|---|---|---|
| *Works For* | 0.8 | 0.6 |
| Person to Employment | 0.8 | 1 |
| Org to Employment | 0.6 | 1 |

Keeping the weight-in of a relationship to a complex relationship entity (e.g., works for relationship) to 1 effectively results as if the other two relationships (i.e., person to employment, organization to employment) were directly connected. When calculating influence between the primary and secondary entity, the weight calculation acts as if the primary entity is not there.

In another example in table 4, roles for persons involved in a movie are shown.

TABLE 4

RoleDetail Values

| Identifier (or ID) | Description | Wt-out | Wt-in |
|---|---|---|---|
| 243 | Lead Actor | 0.8 | 0.7 |
| 244 | Lead Actress | 0.8 | 0.7 |
| 245 | Supporting Actor | 0.6 | 0.8 |
| 246 | Supporting Actress | 0.6 | 0.8 |
| 247 | Minor Acting Role | 0.2 | 0.8 |
| 248 | Cinematographer | 0.8 | 0.7 |
| 249 | Director | 0.9 | 0.9 |
| 250 | Assistant Director | 0.6 | 0.9 |
| 251 | Costume Designer | 0.5 | 0.9 |
| 252 | Art Director | 0.6 | 0.9 |
| 253 | Screenwriter | 0.6 | 0.7 |

In an implementation, the information in the table above are stored in a relational database. But the relational database does not store the weight-in and weight-out of these relationships between the entities. The weights are only taken into account when the information in the relational database are translated as an extract, transform, and load (or ETL) operation to store the data in a graph. This is discussed in greater detail elsewhere in this document.

In an implementation, attributes of the system are associated with a dimension of time. As mentioned before, relationships and entities have attributes associated with them. For example, [Revenue] as an attribute of a company must be tracked with regards to time. On the other hand, certain types of attributes are absolute or do not change (e.g., date of birth, gender, date of a single event), which can be captured in either the entity attributes or relationship attributes table. Other attributes that necessitate a dimension of time, are stored in a time series table. For example, a time series table can include the following columns and descriptions of the columns as shown in table 5.

TABLE 5

| Column | Description |
|---|---|
| TimeSeriesID | Sequential Primary Key |
| EntityID | EntityID of entity to which this time series data point applies |
| TimeSeriesMeasurementTypeID | Refdata representing the thing being measured (revenue, # of employees, etc.) |
| TimeSeriesMeasurementValue | Value of the Measurement Itself |
| TimeSeriesMeasureDateYear | Year of Date of measurement |
| TimeSeriesMeasureDateMonth | Month of Date of Measurement |
| TimeSeriesMeasureDateDay | Day of Month of Measurement |
| TimeSeriesPeriodID | Refdata representing periodicity of the measurement (Annual, Monthly, etc.) |
| TimeSeriesScaleID | Refdata representing scale of measurement (millions, billions, absolute, non-numeric, etc.) |
| TimeSeriesCurrencyID | Identifies the currency of the measurement value, if the units are "currency" (else NULL) |
| TimeSeriesUnitsID | Identifies the units the measurement value is measured in (e.g., currency, people, donations) |

For example, the following relationship is represented in table 6: "Company A had 5 employees in 2007, 20 in 2008, and 50 in 2009."

TABLE 6

Time Series (columns 1-5)

| Time SeriesID | Entity ID | TimeSeries MeasurementTypeID | TimeSeries Measurement Value | TimeSeries Measure DateYear |
|---|---|---|---|---|
| 1 | CompanyA | Number of Employees | 5 | 2007 |
| 2 | CompanyA | Number of Employees | 20 | 2008 |
| 3 | CompanyA | Number of Employees | 50 | 2009 |

(columns 6-9)

| TimeSeriesMeasure DateMonth | TimeSeriesMeasure DateDay | TimeSeriesPeriodID | TimeSeriesScaleID |
|---|---|---|---|
| NULL | NULL | Annual | numeric |
| NULL | NULL | Annual | numeric |
| NULL | NULL | Annual | numeric |

In an implementation, the system breaks down reference data. These parts are: Entity Types; Entity Classifications; Entity Attribute Types; Entity Attribute Values; Relationship Types; Relationship Attribute Types; Relationship Attribute Values; Symbol Type IDs; or Time Series Reference. These types of reference data are discussed following.

Entity Types. Each entity in the system may have many classifications; however it will have exactly one entity type. Some master entity types are as follows:

People: The center of the system's data set. These are very important entities of the system. These are the natural persons in the system. Many of the other entities relate to one or more people in the system.

Organizations: Organizations can be companies, non profits, associations, fraternities, or other. These are also very important entities in the graph.

Events: Some events the system stores are conferences, parties, and award ceremonies. Events that have influential attendees will be stored in the database.

Creative Works: Some examples of creative works are films, TV shows, paintings, books, and other.

Awards: Awards are divided into creative work awards, ranked lists, hall of fame memberships, and honorary degrees. Awards can be given to people, organizations and creative works, and usually are given by an organization.

Products: Products are produced by companies. Products can be dealt with both on an abstract level (for example where one entity represents the product as a whole) or on a per instance level. Company stocks (public and private stocks) are dealt with as products.

Places: Places are a special type of entity in that these entities must be defined in geo-spatial terms (or given a geographical location). Places can be administrative regions (e.g., cities, states, countries, provinces, regions) as well as points or physical places (e.g., restaurants, museums, offices).

Complex Relationship Entities: These are reified relationships that allow the system to connect more than two entities to a relationship. Some examples of these are ownership, employment tenures, and education.

Transactions: Transactions are complex entities in which two or more companies, and potentially a number of individuals are involved in an ownership event. Transactions include private placement transactions, mergers and acquisitions, and bankruptcy transactions.

Entity Classifications. Each entity can have [n] number of classifications. For example, Bill Gates is an {Entrepreneur}, {Technologist} and {Philanthropist}, however his entity type is person. Each entity classification is valid for exactly one entity type (e.g., philanthropist for a person entity type).

Entity Attribute Types. Entity attributes are pieces of information that describe an entity without respect to another entity. Each piece of data that goes into the entity attributes table will have an "Entity Attribute Type" (e.g., birthday, revenue, interest). Attached to that piece of data is a quantitative or qualitative piece of information that is the 'value' or the 'info'. Some Entity Attribute Types have corresponding values that are structured in the reference data, other attribute types allow for freeform entry.

Entity Attribute Values. For each entity attribute there must be a corresponding value. If that value is structured, than it is defined in the [Entity Attribute Value Types] table and that piece of information is attached to the value type defined in the type system. An example of an entity attribute value is "Coin Collecting." This value would be valid for the Entity Attribute type "Interest."

Relationship Types. Each relationship between two entities must have a relationship type. Relationship types are directed, in that it is important that we know which entity is on the left-hand side of the relationship and which is on the right-hand side. Often relationship types mean different things depending on which direction you are looking at it. For example, the relationship type "Parent" has the inverse name is filled in as "Child." The inverse name is used when the relationship is being viewed by the user from the secondary entities perspective.

Relationship Attribute Types. Similar to entities, relationship can have attributes that describe them. For example, for the attended school relationship types, the system can extract the person's degree. Similar to entity attributes, some relationship attributes require that the information be structured and pulled from the relationship attribute value reference items, and other attribute types can be entered free form.

Relationship Attribute Values. Similar to entity attribute values, some of the values for a particular relationship attributes are structured. For example, we have a structured type for "CEO" in our system, but there is no "Chief Yahoo!" Value defined. That is for some attribute types it is valid only to put in a Freeform value into the table, for others, the value must come from the relationship attribute values table, and for others, either a free form value or a structured reference data item is valid.

Time Series Reference. This table defines the referenced values used in the time series table. For example, frequency, currency, and time series measurement.

Symbol Type IDs. The system is designed to process data from multiple sources. In order to keep track of all of these sources the system keeps a table in which identifiers specific to each of these data sources are defined. These assigned values for source identifiers are used in the linking process (as described more later in this document). For example, say the system wanted to process a list of non profit organizations from the United States Internal Revenue Service (the "IRS"). Each organization in the data set would have a distinct identifier (e.g., EIN or employer ID Number) that was given by the IRS, as well as a classification code (e.g., NTEE or National Taxonomy of Exempt Entities code).

The information from a data source (such as the IRS discussed above) would have to be translated into the system's our database in the "linking" process. That is the EIN would have to be mapped to one of our Entity IDs and the NTEE code would have to be mapped to one of our Entity Classification Reference Data Items. A symbols types table defines the keys as well as the data types to which it is valid. Each of these symbol identifiers is valid for a distinct data type, or array of data types. A cardinality is a measure of how many entities a symbol type ID can match to. For example, NTEE codes are common codes that can be shared by multiple organizations so its cardinality is from one NTEE code to multiple (or n) organizations. On the other hand, EIN codes uniquely identify an organization so there is a one-to-one correspondence between EIN numbers and a organization. Additionally, these symbols can be mapped to a more granular level. Table 7 shows an example of this information stored in the system.

TABLE 7

Symbol Types

| ID | Symbol Name | Maps to | Type | Cardinality to Field Values |
|---|---|---|---|---|
| 1 | EIN | EntityID | Organization | 1:1 |
| 2 | NTEE Code | EntityClassificationID | NonProfit | 1:n |

The table gives the name of a particular data point, what field it maps to, the type of thing it is, and the cardinality to CDS field values (or how many of the specified symbols can map to one of the identifiers in the system). As shown above, an EIN must map to exactly one entity ID, but an NTEE code could map to many identifiers in the system. Since the non-profit taxonomy is more granular than the NTEE, there can be [n] number of classifications mapped to one NTEE code.

In an implementation, a number of validation tables of the system tell the database what types of things are valid to go into a particular table. This is important to maintain the integrity of data in the system. In particular, the cleanliness and veracity of the data would be adversely affected. Validation is a means to verify that the data we are taking in is correct, and makes the quality control and quality assurance process much easier. An array of validation tables in the master relational database (e.g., using SQL) constrain the types of things that can be entered in each field.

In yet another implementation, validation for entity classifications are dealt with in the reference data table for entity classifications. Since one classification can only be attributed to one entity type, the ValidEntityTypeID for each classification is kept in the same table. Tables 8 and 9 show sample reference data tables. For the example in table 8, the entity classifications (e.g., academic/education award, athletic award) can have only one entity type identifiers. Some examples of possible entity type identifiers are shown in table 9.

TABLE 8

RefEntity Classifications

| EntityClassificationID | Name | ValidEntityTypeID |
|---|---|---|
| 1 | Academic/Education Award | 1 |
| 2 | Arts & Entertainment Award | 1 |
| 3 | Athletic Award | 1 |
| 4 | Civic Service Award | 1 |
| 5 | Commercial/Business Award | 1 |

TABLE 9

Ref_EntityTypes

| EntityTypeID | Name |
|---|---|
| 1 | Awards |
| 2 | Creative Work |
| 3 | Event |
| 5 | Place |
| 6 | Organization |
| 7 | Person |
| 8 | Product/Brand |
| 9 | Address |
| 10 | Building/Structure/Property |
| 11 | Security |
| 13 | Transaction |
| 14 | Complex Relationship Entity |

In an implementation, the system validates entity attribute types. Entity attributes can apply to multiple or [n] number of entity types or entity classifications. The validation table is set up such that a particular entity attribute can be valid either to an entity type on the whole, or entity classifications. For example, "Gender" will apply for all people and can be validated by the Person type. However, something like "Medical Specialty" may only apply to entities who are classified as "Medical Professional." Since one attribute can apply to many types or classifications, there is a validation table that stores the valid combinations of what entity attributes can apply to what types of entities. Some sample entity attribute types are shown in table 10.

TABLE 10

ValidEntityAttributeTypeID

| ID | EntityAttribute Type ID | Name | ValidField | ValidFieldValue |
|---|---|---|---|---|
| 1 | 141 | Company Sector | EntityClassificationID | 57 (Company) |
| 2 | 34 | First Awarded | EntityTypeID | 1 (Award) |
| 3 | 58 | Film Genre | EntityClassificationID | 14 (Film) |
| 4 | 59 | Number of Episodes | EntityClassificationID | 23 (TV Show) |
| 5 | 62 | Number of Seasons | EntityClassificationID | 23 (TV Show) |
| 6 | 13 | Marital Status | EntityTypeID | 7 (Person) |
| 7 | 25 | Gender | EntityTypeID | 7 (Person) |
| 8 | 29 | Email | EntityTypeID | 6 (Organization) |
| 9 | 29 | Email | EntityTypeID | 7 (Person) |

This table can be used in conjunction with, for example table 9. For a particular entity attribute, there are "N" number types of entities that can be attributed here. In table 10, for the "First Awarded" attribute, the type of thing that can be referenced is an award. In another example, an entity classification of email can have an entity type identifier corresponding to a person or an organization. For the "Number of Seasons" and "Number of Episodes" attribute, they can that have an entity classification of 23 (for TV Show).

In an implementation, the system validates entity attribute values. Like entity classifications, each attribute value can have one associated attribute type. This does mean that the system has duplicated data because different attribute types may call on the same value. For example: "Person A has an attribute of [Interested_In] and a value of [Soccer]; and Team B has an attribute of [Affiliated_Sport] and also has a value of [Soccer]." Since one value can have one associated attribute type, the two soccer values are duplicates. [Soccer] in the context of interests, is different from the [Soccer] in the context of affiliated sports. However, these values do get tied together in our "Concepts Ontology" as discussed later in this document.

In an implementation, the system validates relationship types. Validation for relationship types constrains the database such that only certain types of entities can go on either the left or the right hand side of a particular relationship type. Like validation for entity attribute values, one valid record could be attributed to either an entity type or an entity classification. Additionally there are multiple or [n] number of valid combinations for a particular relationship type. For example, the [Is Parent of] must have an entity of type person on the left and the right hand side of that particular relationship. Since all classifications of people can have Parents, validation for an entity type is needed.

On the other hand, the [is member of] relationship type has validation such that a type (e.g., person or organization) can be on the left and classification (e.g., trade union, social organization/club, political party) can be on the right. Each valid combination for a relationship type is its own row in the Valid RelationshipTypeIDs table. Table 11 shows sample valid relationship types.

TABLE 11

| Valid Relationship TypeID | EntityID_1 Valid EntityType ID | EntityID_1 Valid Entity-Classification TypeID | EntityID_2 ValidEntity TypeID | EntityID_2 Valid Entity-Classification TypeID |
|---|---|---|---|---|
| 11->Is/Was a Member of | 7->Person | NULL | NULL | 6->67-> Political Party |
| 11->Is/Was a Member of | 7->Person | NULL | NULL | 6->68-> Professional Association/Body |
| 11->Is/Was a Member of | 7->Person | NULL | NULL | 6->69-> Religious Organization |
| 11->Is/Was a Member of | 7->Person | NULL | NULL | 6->71-> Trade Union |
| 11->Is/Was a Member of | 7->Person | NULL | NULL | 6->128-> Fraternal/ Academic Organization |
| 4->Is Parent of | 7->Person | NULL | 7->Person | NULL |

In an implementation, the system uses different data models to store its data. The system provides information on people, and other entities in a number of ways and each piece of data captured has been thoroughly modeled to fit the back end table structure of the system. The ontology dictates how a given piece of information gets entered into the system via a number of reference data items. It is important to note that while the ontology does model a number of things that happen in the world, the ontology is not an attempt to model the entire world in the database. Rather, the aim of the ontology is to provide a framework that is capable of storing all of the types information that is valuable to our high end user base.

Figure 8:
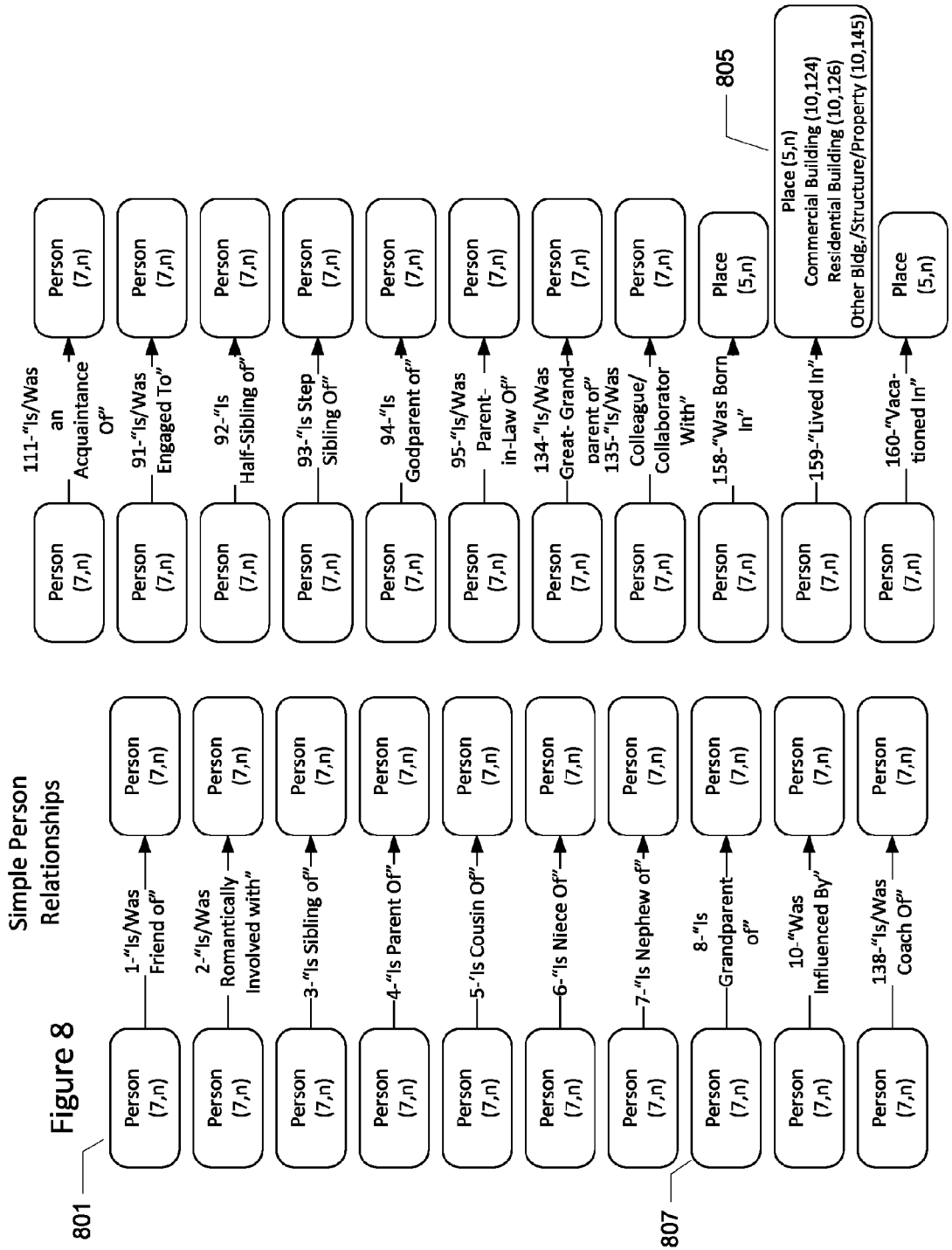
FIG. 8 shows a variety of basic person relationships of the system.

FIG. 8 shows some simple person relationships in the system. For example, relationship 801 shows a first circle or bubble (which represents a person entity or a person node) connected with an arrow to a second circle or bubble (which represents another person entity or person node). In relationship 801, the arrow represents the relationship type "Is/Was Friend of." The annotation (7, n) in the first and second person bubble is 7 for the entity type identifier assigned by the system to a person entity and n in that this particular relationship type, allows any number of classifications under the "Person" type.

In another example, relationship 805 shows a first person entity connected by an arrow for the relationship type "Lived In" to a second bubble with five locations. These different locations are geographical locations related to (or associated with) the person (e.g., commercial building, residential building). In an implementation, a geographic location is valid for more than one location related to a person (e.g., the commercial building is the same as their residential building).

The relationships shown in FIG. 8 are simple and binary. Some of these relationships however, imply a third entity that would exist in the middle of these two people. For example, relationship 807 "Is Grandparent of" and can be added as a direct relationship between two people. However, this relationship implies another person, a parent, actually exists in between the entities. Further discussion on this is provided elsewhere in this document.

Figure 9:
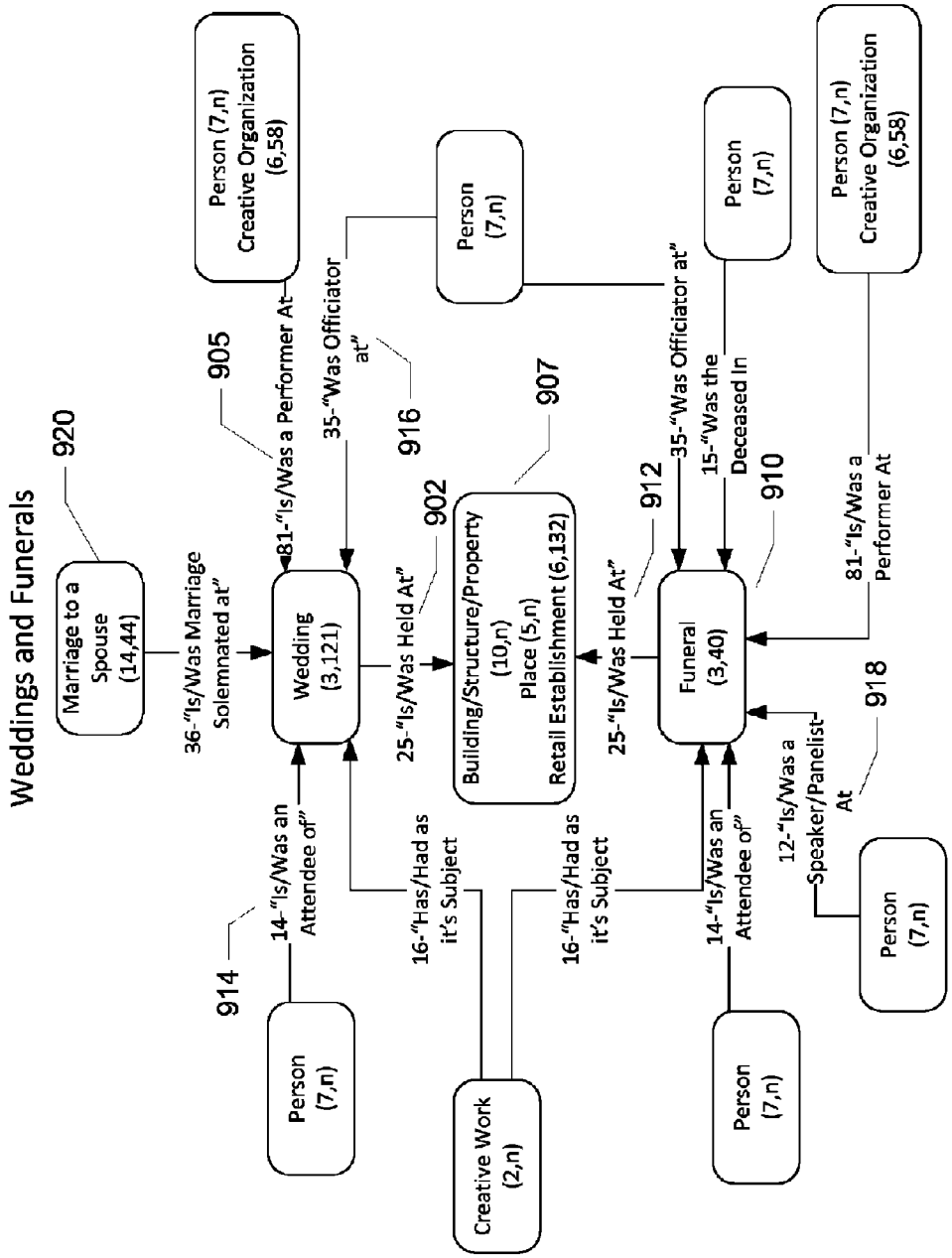
FIG. 9 shows a schema for an event entity.

FIG. 9 shows a sample schema for an event entity. Two types of events the system can track are weddings and funerals.

Even though a wedding and funeral are very different events, similar structure is used by the system to store the information for a funeral and a wedding. For example, the wedding "Is/Was Held At" is represented by an arrow 902 linking the wedding entity 905 to location information on where the wedding 907 was held (e.g., a place structure, retail establishment). Similarly, a funeral entity 910 has an arrow 912 representing "Is/Was Held At" location information 907 on the funeral. Since the details of the location information are the same for a wedding a funeral, they reference the same bubble 907. Other relationships in FIG. 9 include: persons in attendance at the wedding 914, persons who officiate the wedding 916 (for example the priest who solemnizes the wedding), a speaker/panelist at the funeral 918.

However, some events may have special designations particular to the event. For example, the wedding entity 905 is related to the marriage to a spouse relationship 920, which a funeral entity would not have or need.

In an implementation, the marriage to a spouse relationship 920 is a complex entity. Instead of creating an edge between two people with a label of "Married," the system creates complex entities out of these relationships. This is so the system cam use a marriage instance to refer to other entities such as donations, wedding, or a divorce.

In another implementation, a creative work can have as its subject any type of entity (e.g., person, organization).

Figure 10:
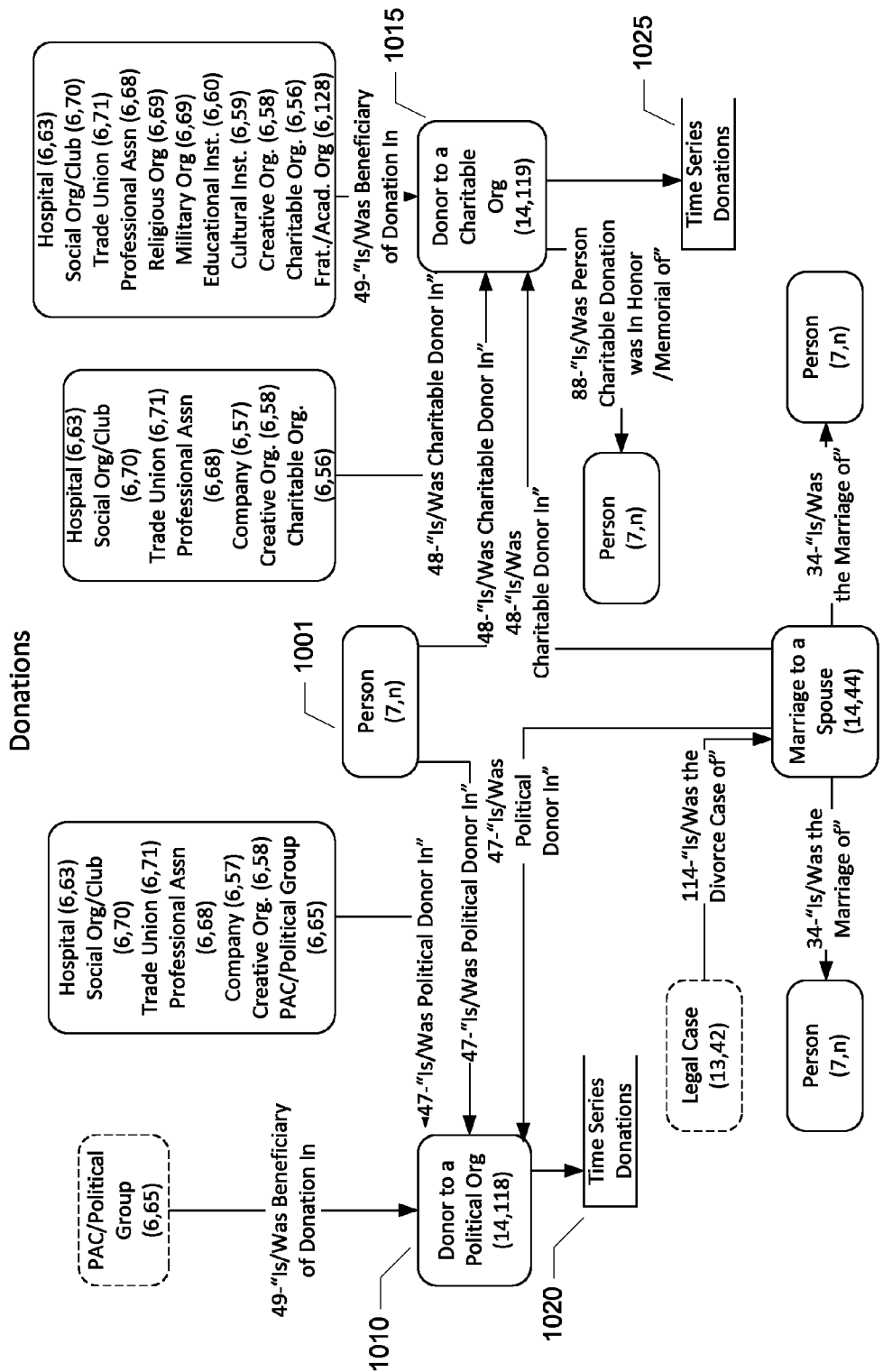
FIG. 10 shows a complex entity.

FIG. 10 shows a sample complex entity for a donation. This is because more than one person or entity can make a donation to an organization. To scale and accurately represent this data, a donations entity is represented as a complex entity. Additionally, by keeping a donation as a separate entity, the system can track all of the donations that a person or a group of people made to an organization as time series data. This allows simplifying the system in a situation where repeated edges may represent very similar information that are different only in time. An example is that if a person gave ten donations in ten years, the system would not create ten edges between the person and the organization, rather the system would associate the donation to the donation complex entity, create one edge to the person, and the donation instance, one edge from the donation instance to the organization, and create one record for each donation, its amount and its date in the time series table. When merging to the graph the system aggregates this information to create one influence score for the relationship instance.

In an implementation, the system tracks political and charitable donations separately. This is because different validation system (as discussed above) is used for each. A political donation must be to a political action committee (PAC), super PAC, or other political group. Even if a source says that Person A donated to Candidate B's Presidential Campaign, in reality the Donation went to the PAC. The system would prevent a political donation to be associated with the campaign and rather suggest the associated PAC to that campaign. For example, a person 1001 makes both political and charitable donations. The persons' donations are represented by an edge connecting them to the political organization 1010 and the charitable organization 1015. Since the person made (or could have made) multiple donations to the political organization or the charitable organization, the dates and amounts for the donations are tracked separately in a time series donations 1020 and 1025.

In an implementation, donations made by a group of persons is tracked. For instance, when a married couple makes a donation, the marriage instance is connected to the donation instance.

Figure 11:
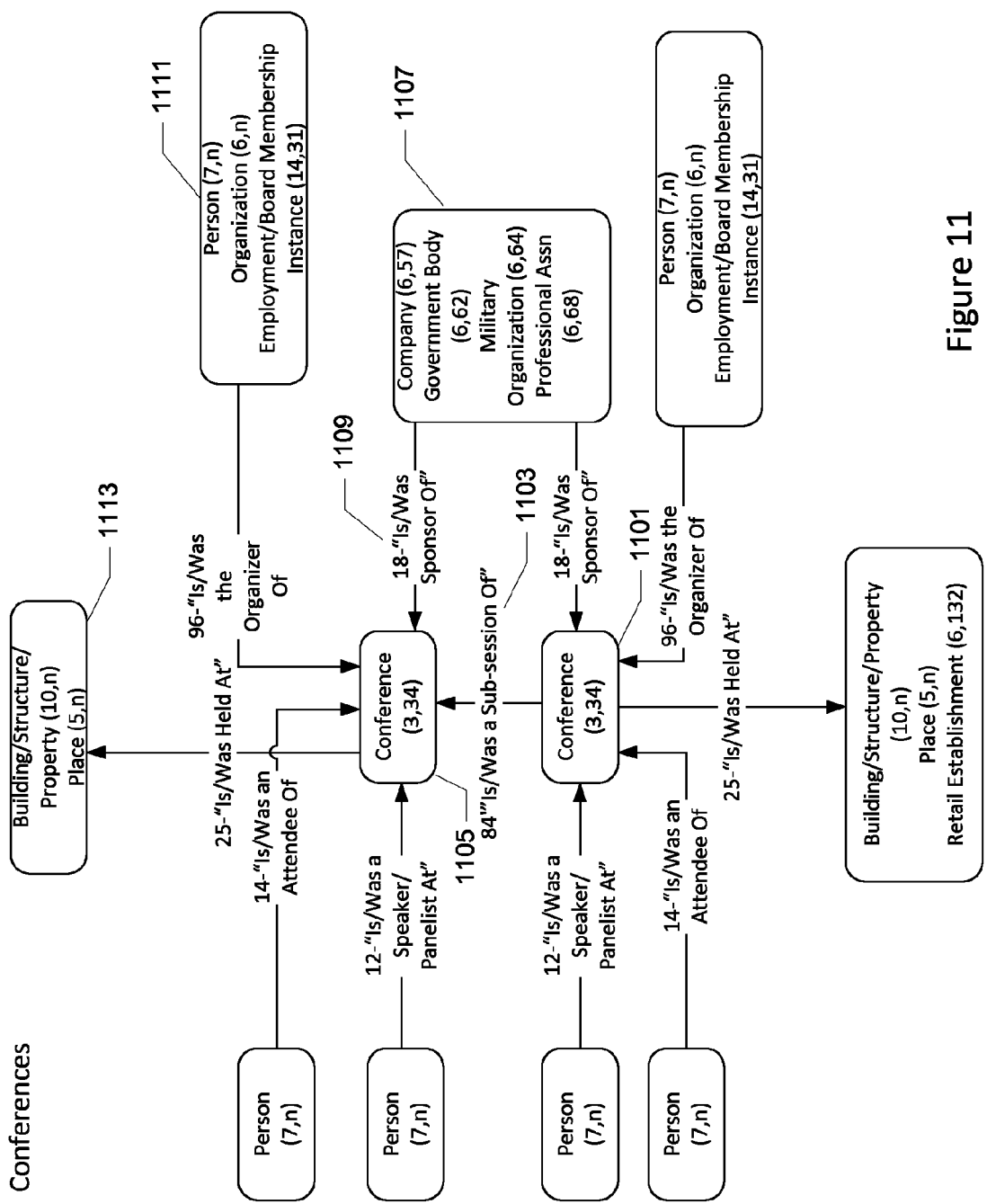
FIG. 11 shows a schema for a conference.

FIG. 11 shows a sample schema for a conference. Most conferences happen on a time interval, most being yearly. The system ontology structures this information with each instance of a conference or an event as its own event entity with a "date." There is also a master event entity with a classification of "Conference series." For example, the conference entity was a subsession of another conference entity 1105. The major sponsoring organization 1107 of the conference 1105 has a relationship to the conference entity with an edge 1109 of "Is/Was Sponsor Of." In an implementation, each year, conferences tend to have different sponsors. In which case, that same edge would connect the event instance to the sponsor for that year.

A conference instance can also have sub conferences, or panels. For example, another conference entity 1101 has a "Is/Was Sub-Session of" relationship 1103 to the main conference 1105. Conference has organizers 1111 which can either be a person, a organization, or an employment instance. The employment instance would be connected to the conference as an organizer if that a particular person organized the event on behalf of a certain company or organization. Conferences, and all events, can be "Held at" a place 1113, structure or retail establishment.

Figure 12:
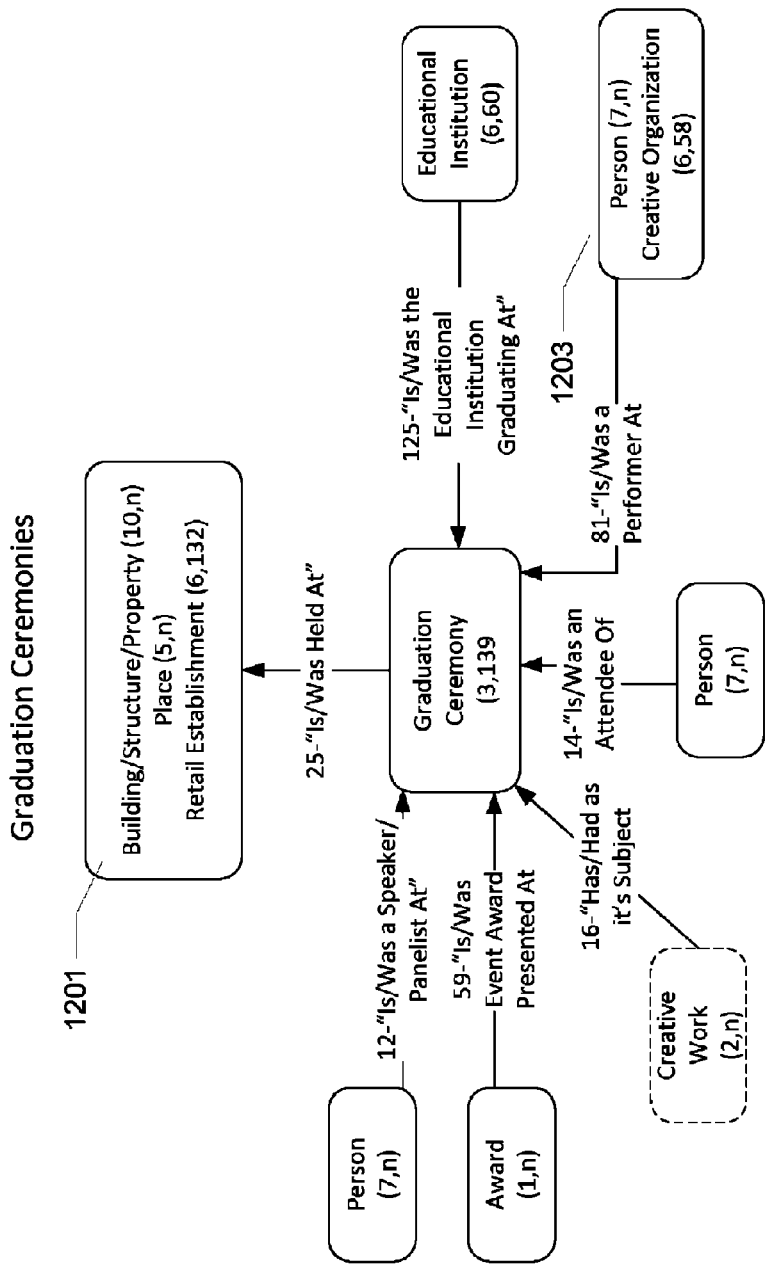
FIG. 12 shows a schema for a graduation ceremony.
Figure 13:
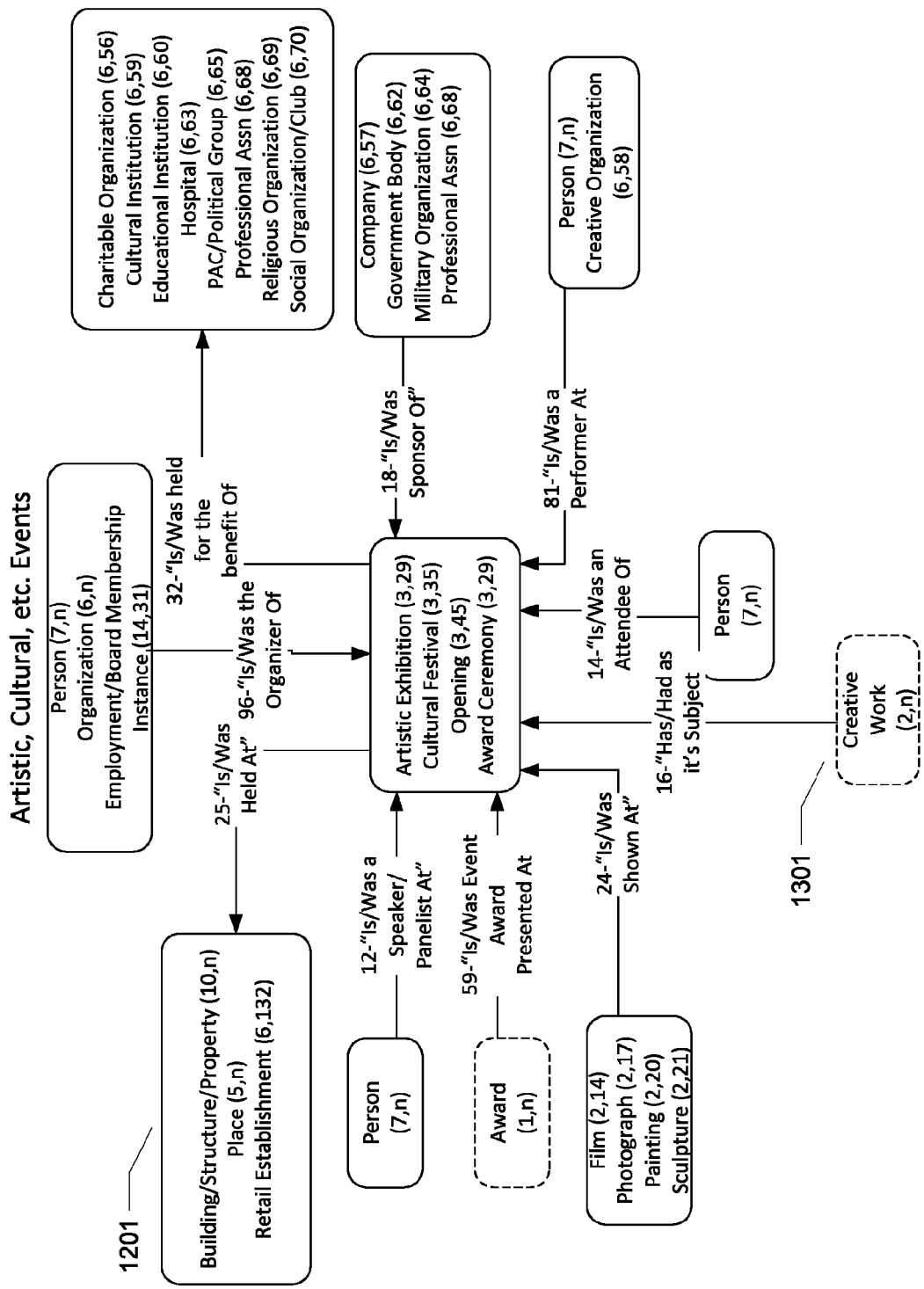
FIG. 13 shows a schema for an artistic, cultural, or other event.
Figure 14:
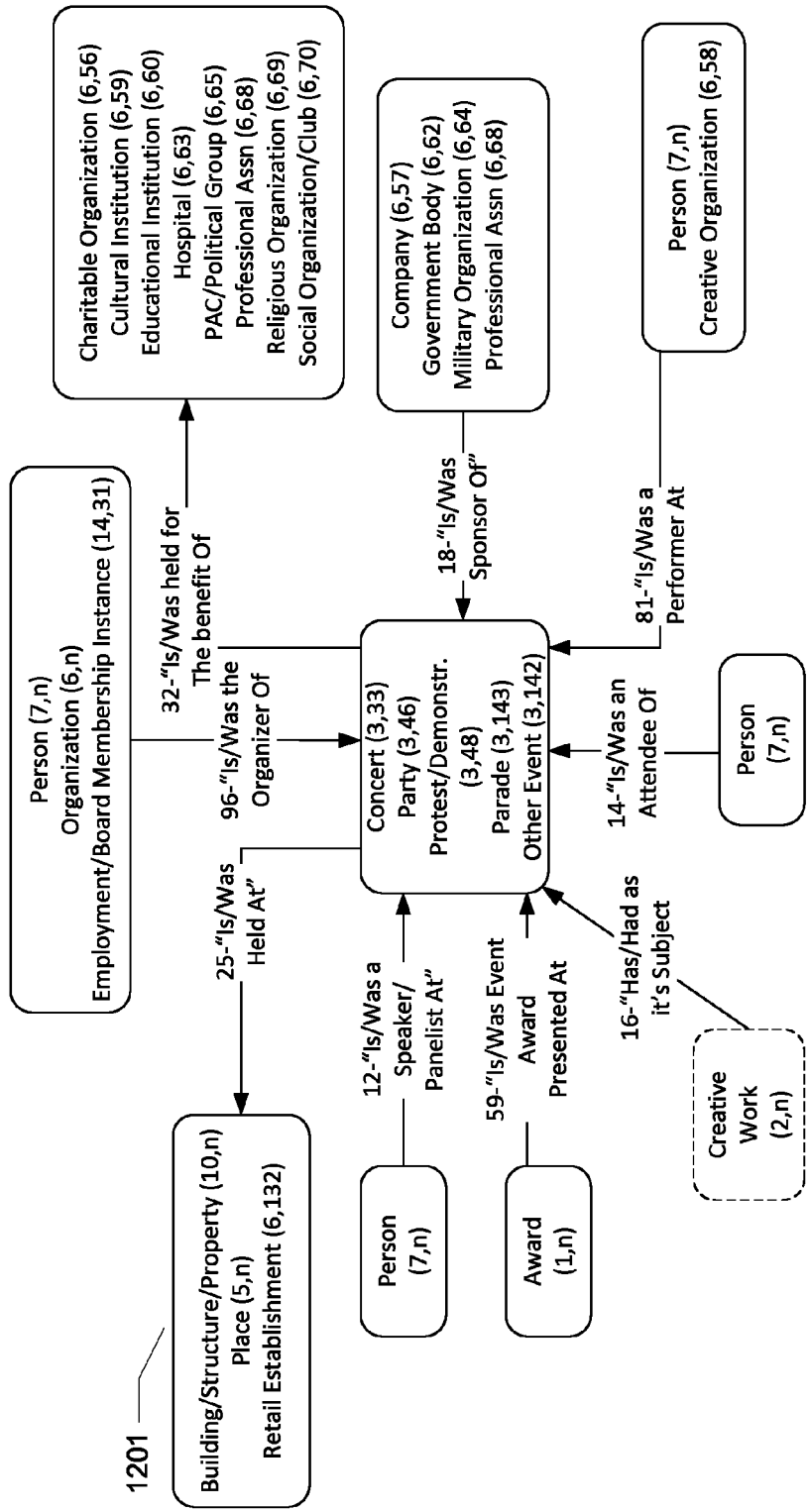
FIG. 14 shows a schema for a concert, party, or protest.
Figure 15:
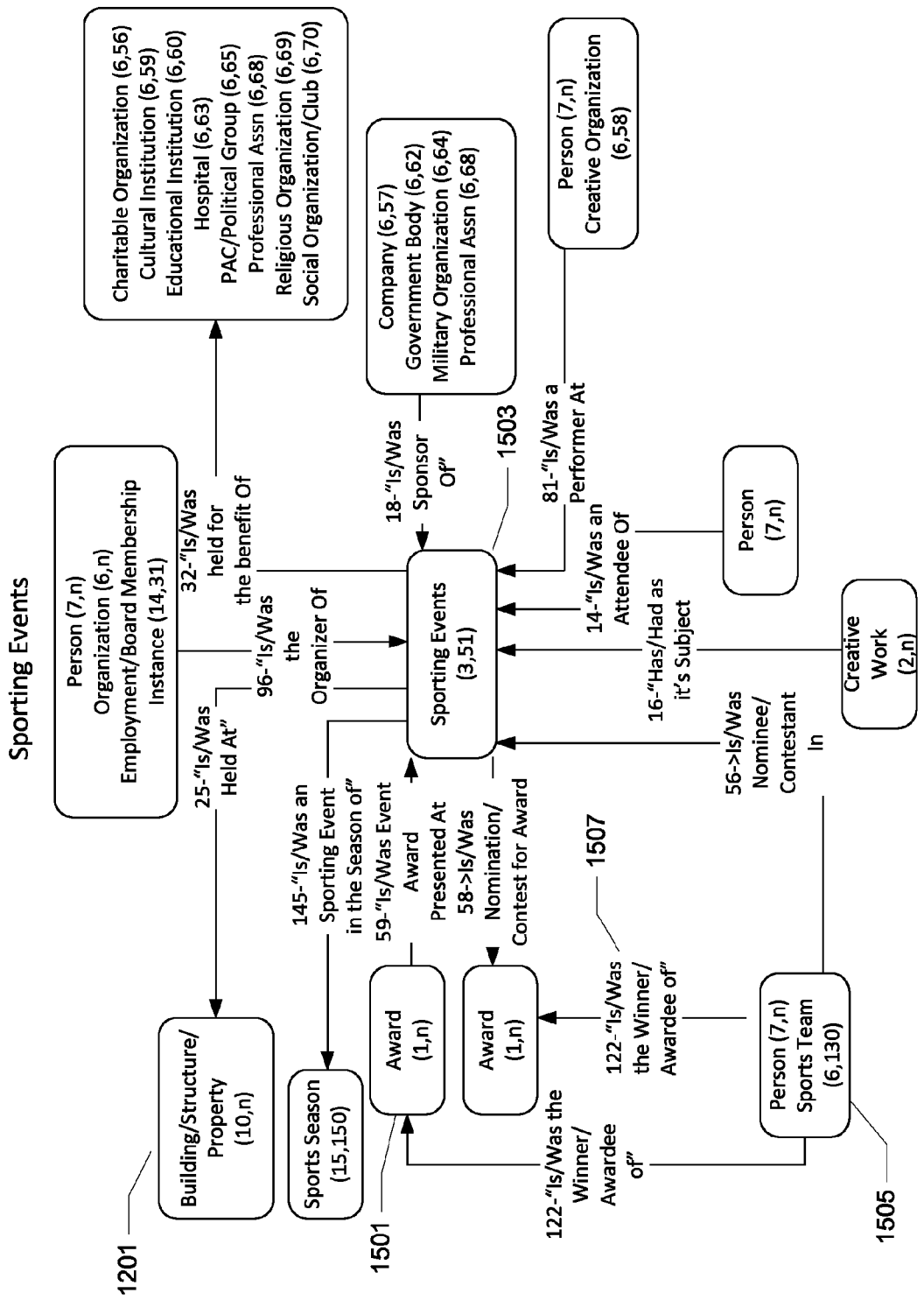
FIG. 15 shows a schema for a sporting event.

Many different types of events can be represented and stored in the system. The events are modeled similarly, depending on the type of event, different validation is performed by the system. FIG. 12 shows a sample schema for a graduation ceremony. For example, in a cultural event there can be an edge attached of type "Is/Was Performer At" 1203, for the case when a band, or an artistic group performs at the event. FIG. 13 shows a sample schema for a artistic, cultural, or other event. For relationship "Has/Had as Its Subject" to entity creative work 1301, a dashed bubble surrounding the creative work represents that the relationship is not necessary to the artistic, cultural or other event. In other words, not all artistic, cultural or other events involve a creative work tracked by the system, although most may. FIG. 14 shows a sample schema for a concert, party, or protest. FIG. 15 shows a sample schema for a sporting event. Sporting events have awards, or championships associated with them. For example, the World Series championship which is an award to a team in Major League Baseball, has associated with it, the event World Series. This can be stored in the system with the relationship "Is/Was Nomination/Contest for Award" relationship type associated with an award 1501. In order for a person or a sports team to be designated with this particular relationship type, they must have a "Is/Was Nominee/Contestant in" relationship type to the Sporting Event 1503 that the award is associated with. If an Award is given with regards to a particular sporting event to a specific person, for example, the World Series Most Valuable Player (MVP), the Award is connected to the event with the "Is/Was Award Presented At" relationship type 1501. In an implementation, an award can be given to a person or a sports team 1505 via the "Is/Was the Winner/Awardee Of" relationship type 1507.

Figure 16:
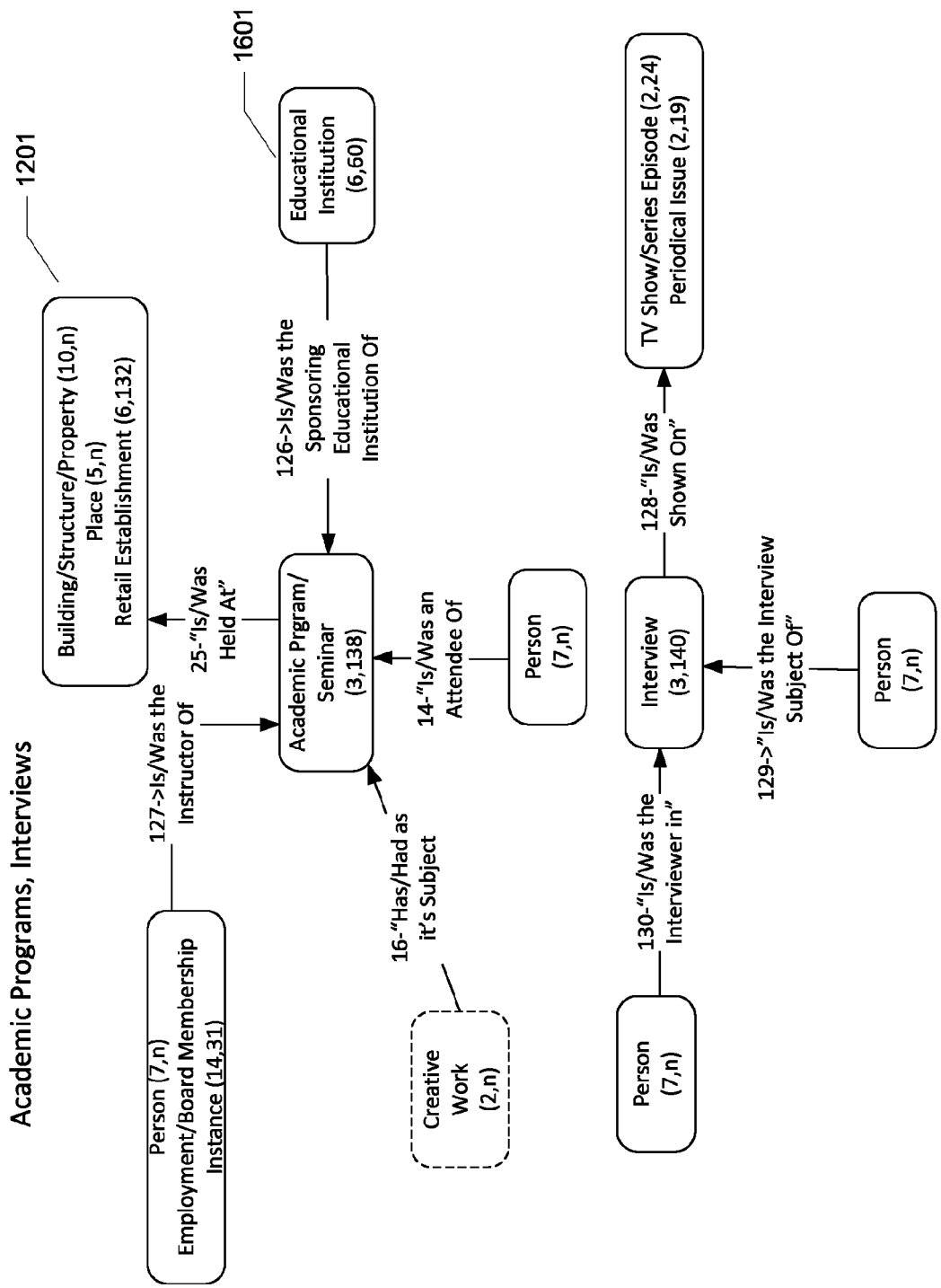
FIG. 16 shows a schema for an academic program or interview.
Figure 17:
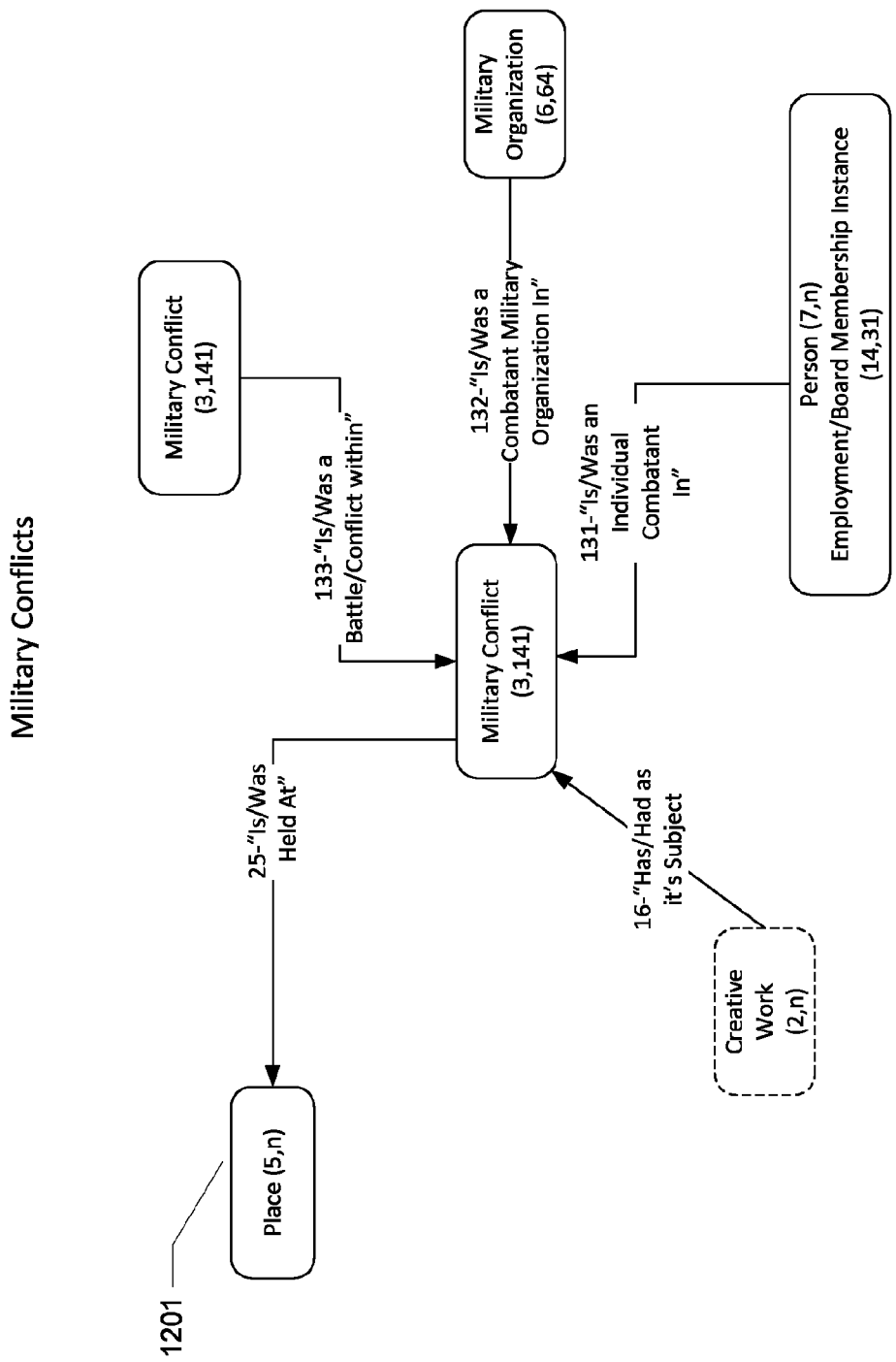
FIG. 17 shows a schema for a military conflict.
Figure 18:
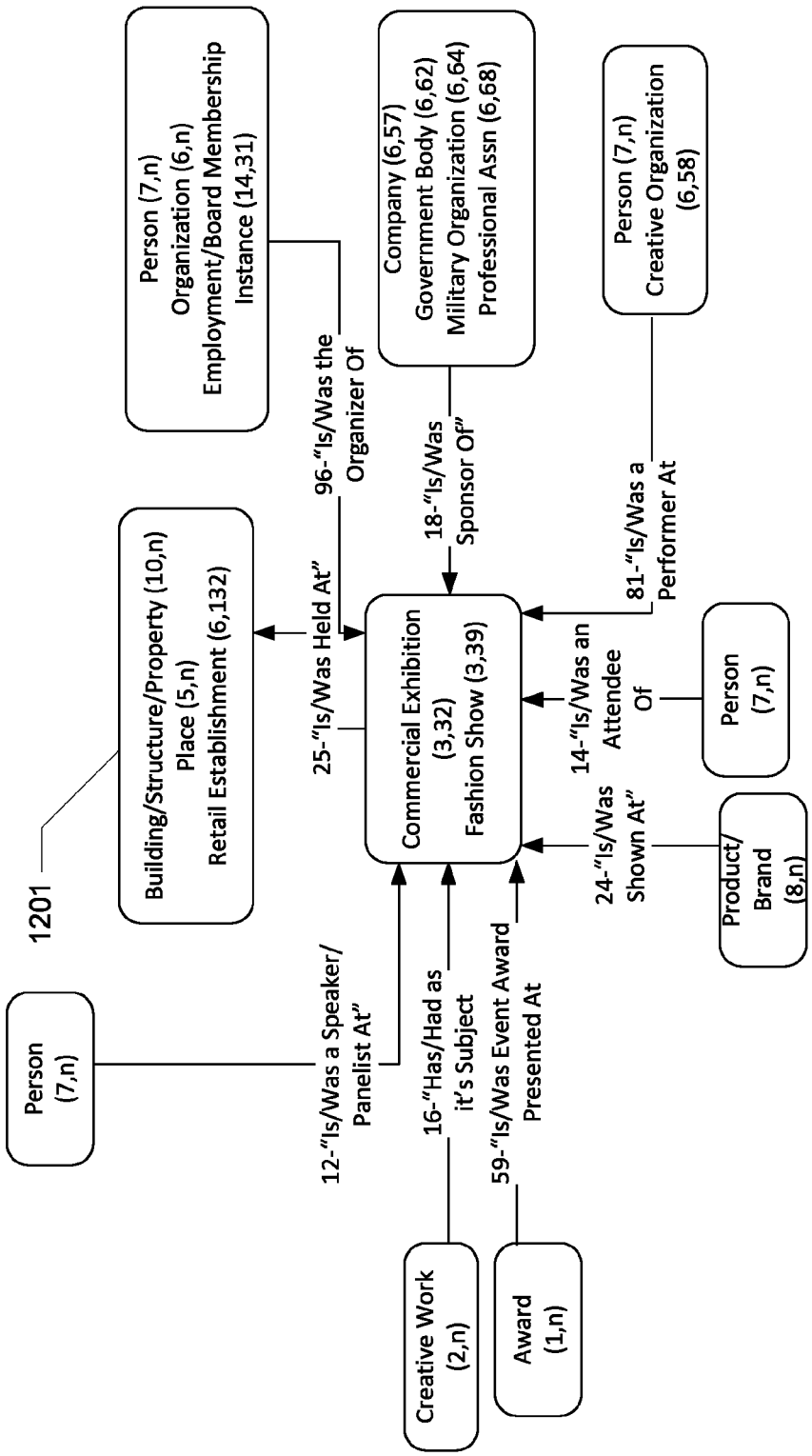
FIG. 18 shows a schema for a commercial exhibition or fashion show.

A sporting event can also be held for the benefit of a nonprofit organization, it can be the subject of a creative work, and it can be attended by a person. Also a person or a creative organization (band) can be associated with the Sporting event with a "is/was a performer at" relationship type. FIG. 16 shows a sample schema for a academic program or interview. In this event, there is a relationship "Is/Was the Sponsoring Educational Institution Of" that connects to an entity "Educational Institution" 1601. This is used for programs that require a reference or sponsor from a educational institution as part of the admissions process. FIG. 17 shows a sample schema for a military conflict. FIG. 18 shows a sample schema for a commercial exhibition or fashion show.

Many events will also have associated with it a location. However, even when there is a single relationship shared between multiple events, their allowable inputs can vary. For example, both the graduation ceremony and artistic, cultural, or other event has a "Is/Was Held At" relationship to a geographical location 1201. For example, this relationship 1201 for graduation ceremonies allows: building/structure/property; place; or retail establishment. This relationship 1201 for sporting events allows building/structure/property. This relationship 1201 for military conflict allows places.

Figure 19:
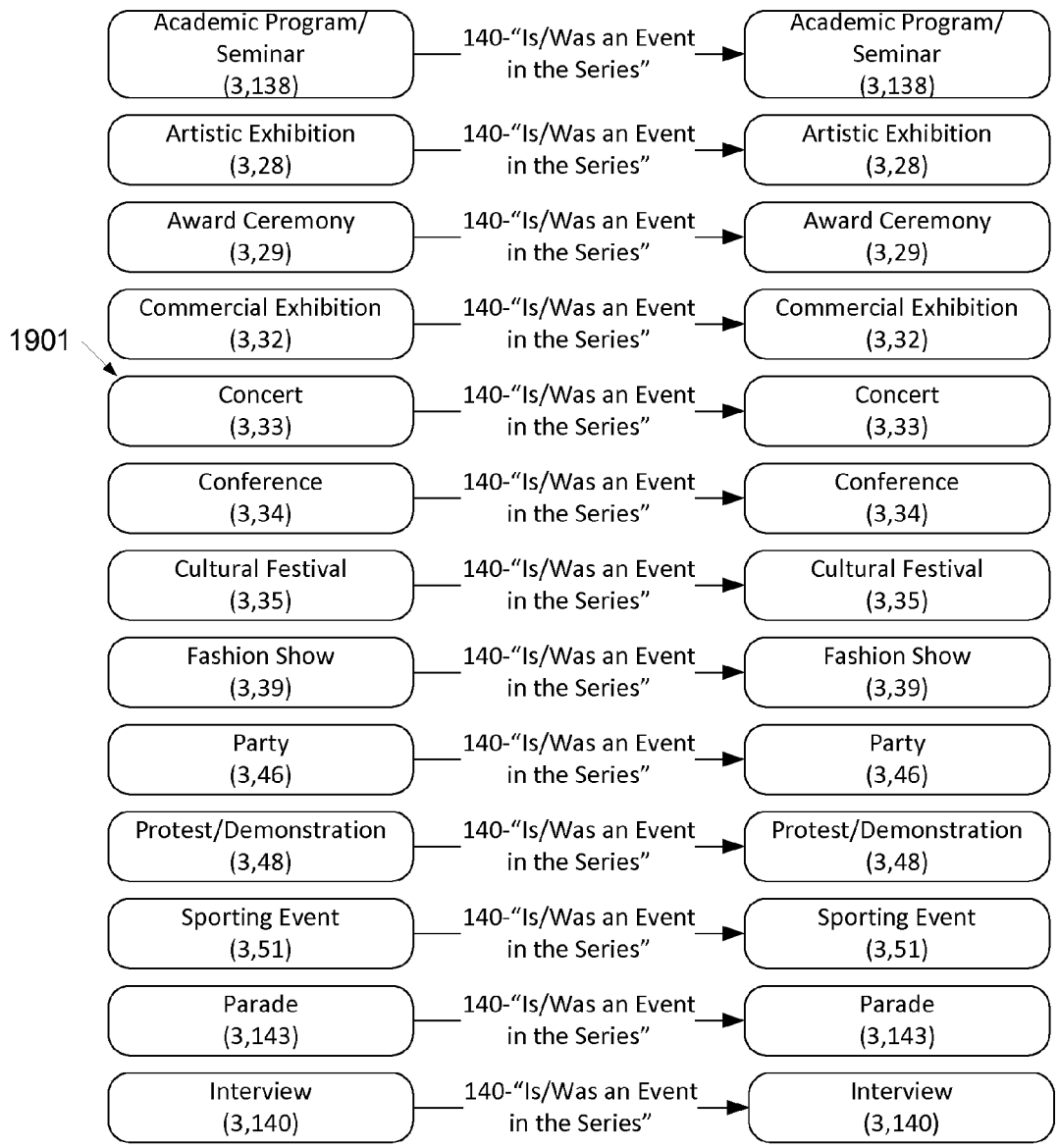
FIG. 19 shows a schema for an event series.

FIG. 19 shows sample schema for a event series. An event series can be a sub-element of a larger event. For example, for event series 1901, a concert is linked to another concert with the relationship "Is/Was an Event in the Series." This can be a soloist performance, within a larger performance by an orchestra.

Figure 20:
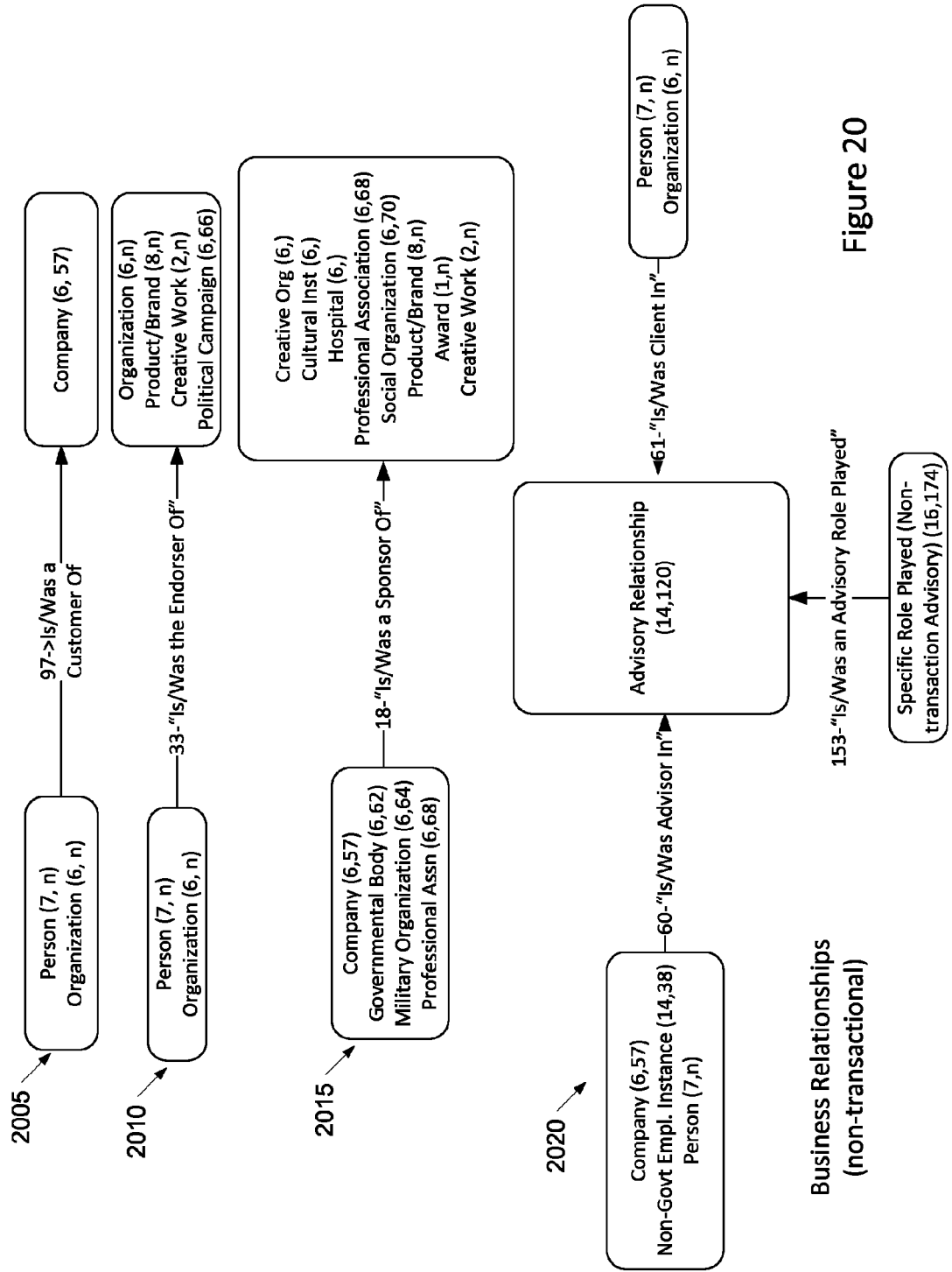
FIG. 20 shows a schema for a business relationship.

FIG. 20 shows a sample schema for a business relationship. This excludes transactional relationships, which are discussed elsewhere in this document. In an implementation, a business relationship is modeled with three simple relationships (reference items 2005, 2010, and 2015) and one complex relationship (reference item 2020). For example, in the first relationship 2005, a person or an organization can be a customer of a company. In the complex relationship 2020, an advisory relationship represents: "Company A advised Company B." The system represents this as: "Company A [was advisor in] Advisory Relationship C" and "Company B [Was Client in] Advisory Relationship C." When the system performs validation on this information, it checks restricts a person from being the advisor in an advisory relationship. This is because, in a real-world situation, almost never does an individual advise a company or a person directly, they do so through a firm. In a common example, a lawyer advises a person in a legal case. The person however is not advising directly on their own behalf, rather they are advising on behalf of the firm (or company) they work for. For this reason the employment instance of that lawyer would be the "advisor in" the advisory relationship.

Figure 21:
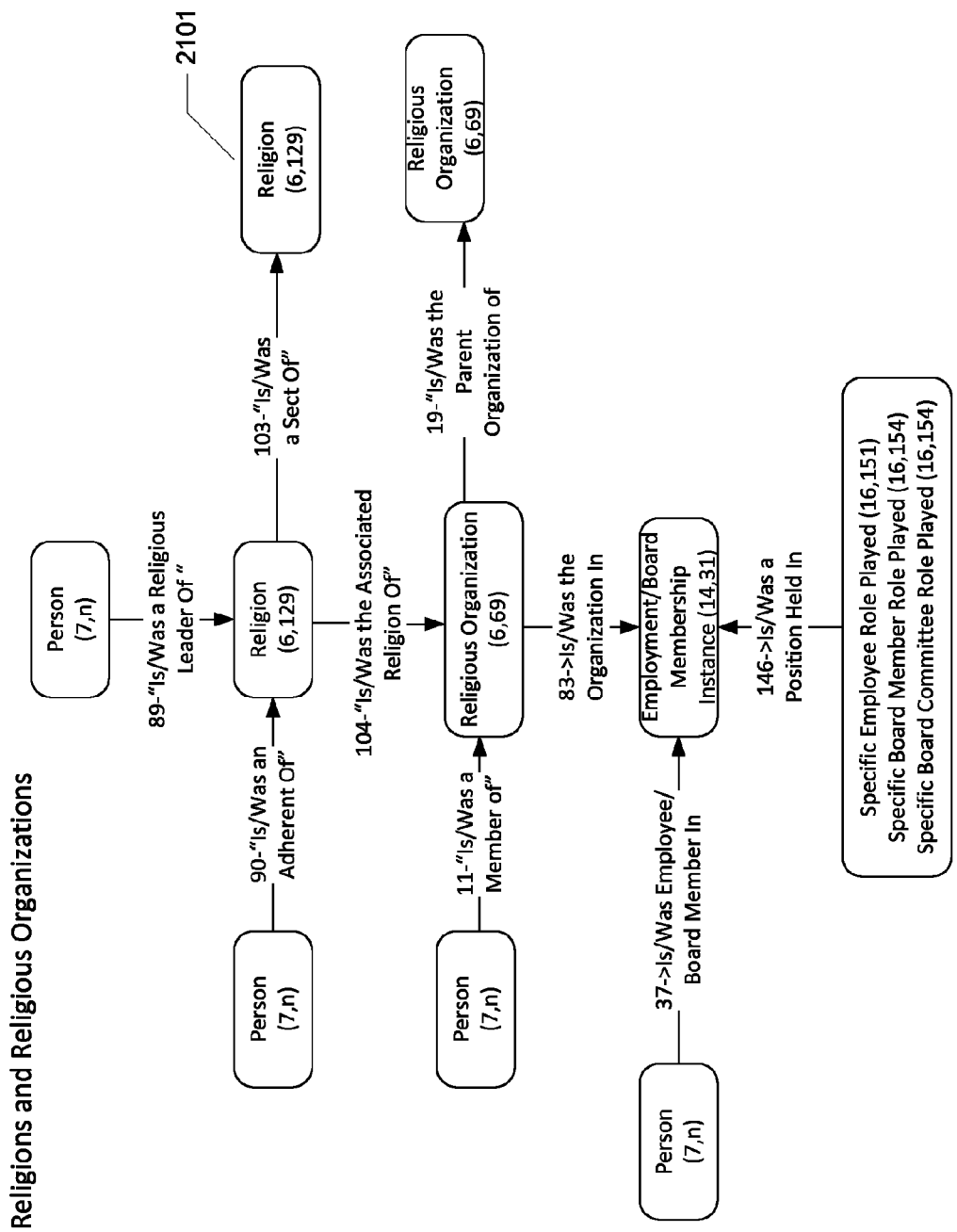
FIG. 21 shows a schema for religion and religious organizations.

FIG. 21 shows a sample representation of religion and religious organizations. Religions are their own entities, and they have related religions (or sects) 2101 connected by the "Is/Was Sect Of" relationship type. Some religions are affiliated with religious organizations so, for example, an Catholic Archdiocese is related to "Roman Catholicism." This schema allows for a person to be related to a religion with an edge type of "Is/Was Religious Leader Of." This allows the system to create a very strong bond between the religious leader and the associated religion.

In an implementation, the system uses a complex relationship entity to represent employment. This is represented as a node between a person entity, and an organization entity. This is because of the fact that while working at a company, a person is likely to have many interactions with other people, other organizations, and others. So the complex relationship is useful to store these additional relevant information.

Figure 22:
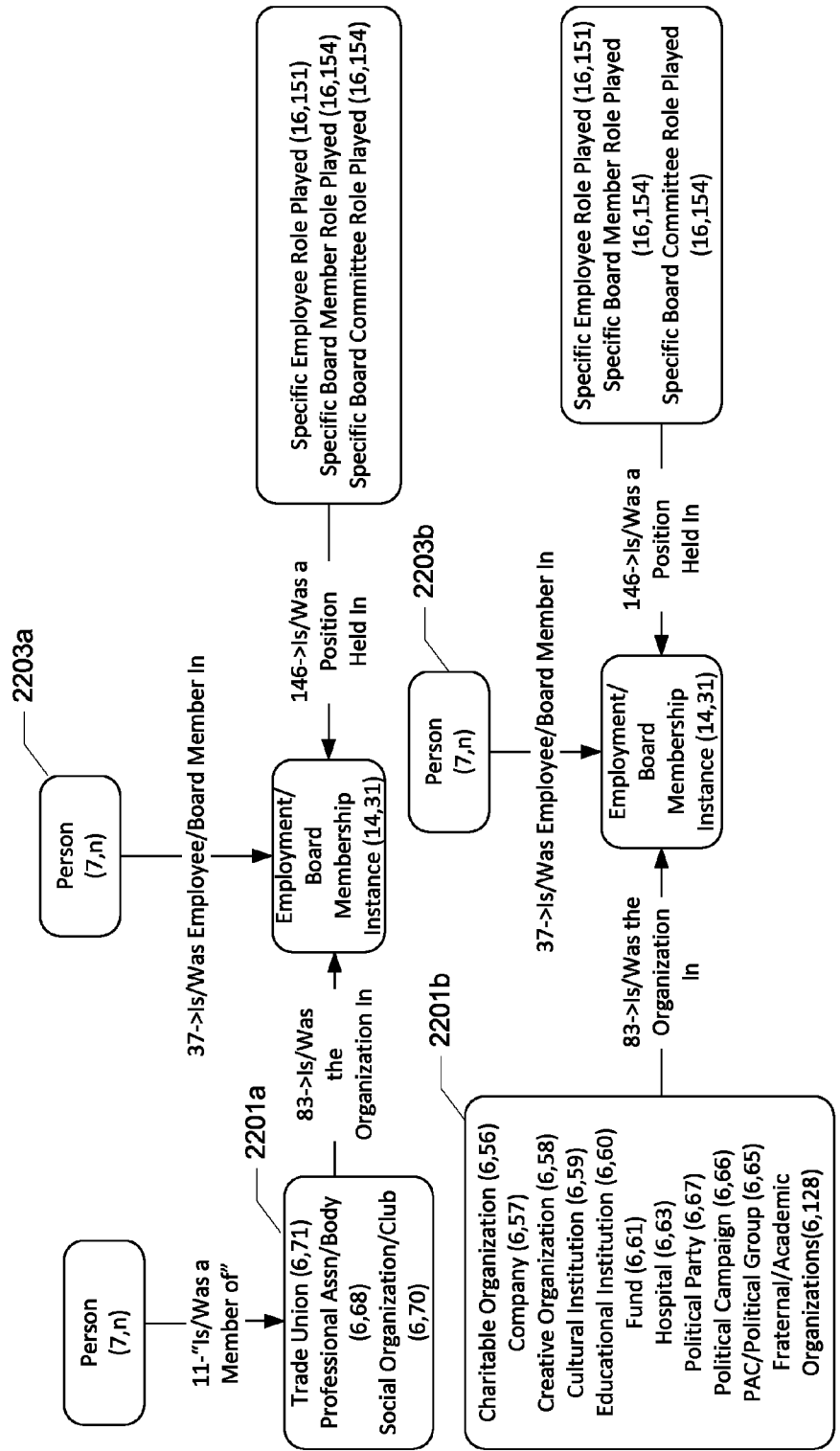
FIG. 22 shows a schema for employment, excluding the military and sports.

FIG. 22 shows a sample representation of employment, excluding the military and sports. Employment is a complex entity in the system of classifying an employee (for a non-government organization).

This employment relationship entity must have associated with it exactly one organization and one person. For example, items 2201*a* and 2201*b* represent organizations or companies. Items 2203*a* and 2203*b* represent persons that serve on the company's board or as an employee of the company. Board membership is a stored as a complex relationship entity. Further information on the employment relationship, such as the position and time-span of employment, are kept in entity details. Also notice at the top that a person (or an organization) can be a "Member Of" the types of entities listed in the below box.

Figure 23:
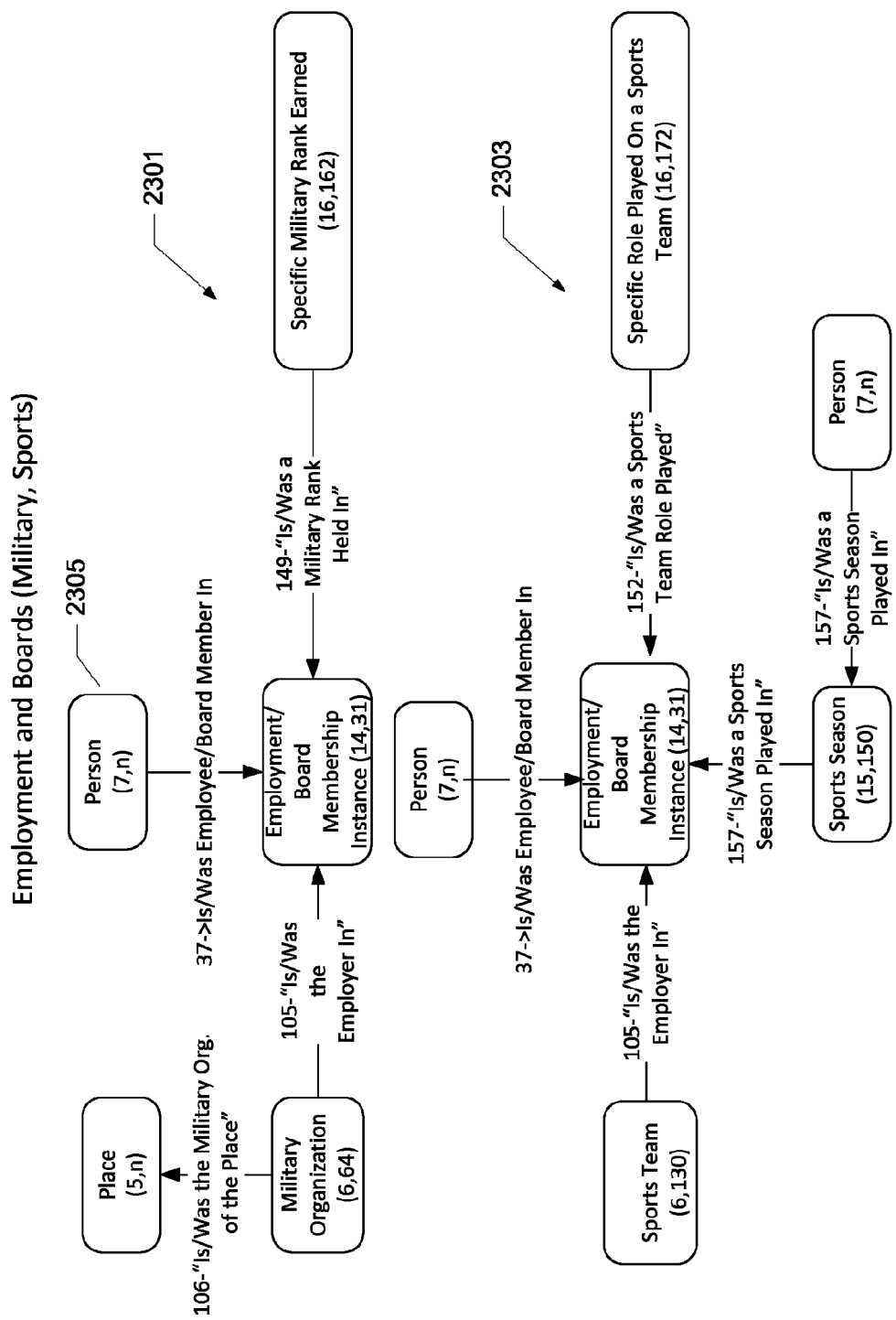
FIG. 23 shows a schema for employment and boards such as military in and sports.

Not all organizations allow membership. FIG. 23 shows a sample representation of employment and boards such as military in 2301 and sports in 2303. In the system, these do not allow memberships but are classified as employment. For example, a person who played in a band, or on a sports team, is not connected to them through a "Is/Was Member" role but an employment instance. The system achieves consistency in its data by restricting what type of relationship can be used allows the system to find and extract powerful relationships between various entities. For example, the relationship "Is/Was Employee/Board Member" for the person 2305 in the military example show in FIG. 23. For military, a person has an employment instance to a military organization. That military organization comes from a particular place (e.g., the U.S. Army "Is/Was the Military Org of the Place").

Figure 24:
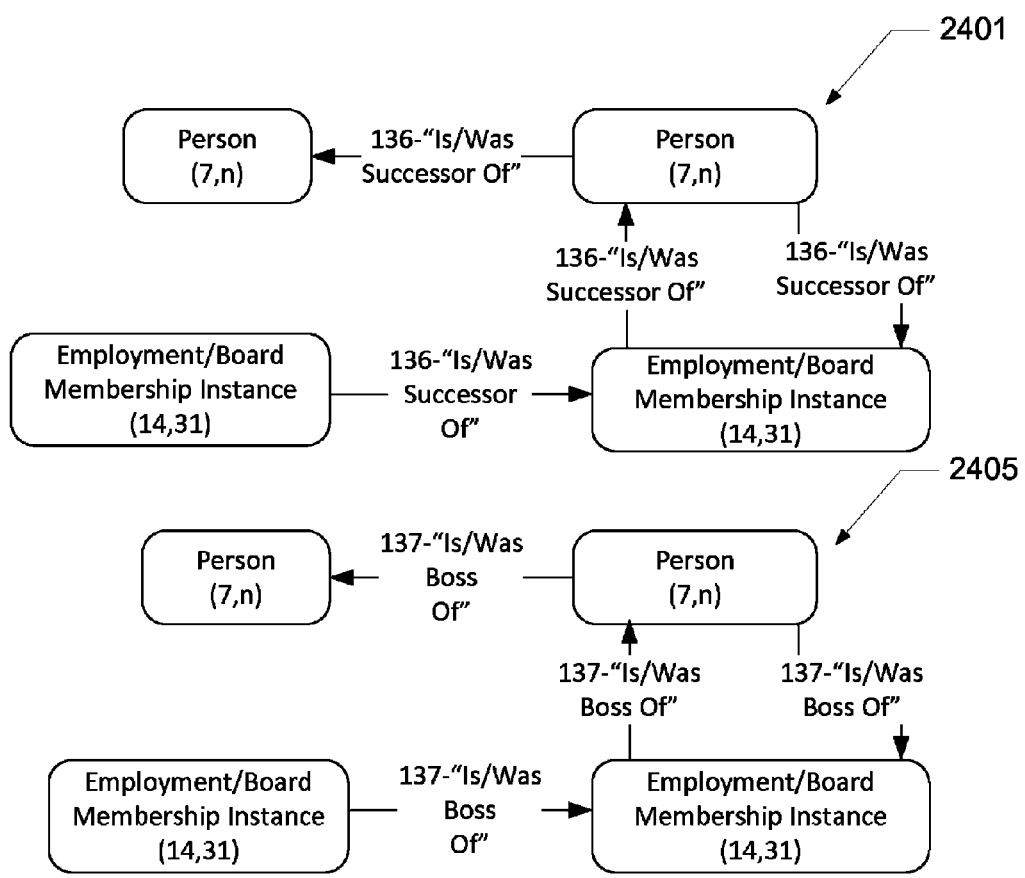
FIG. 24 shows a schema for direct coworkers relationship.

FIG. 24 shows a sample direct coworkers relationship in the system. A first relationship 2401 stores successor information for an employment or board. For example, useful information can be extracted by analyzing, not only who is the current person holding a position, but who came before to understand the interrelationships of persons at an organization. A second relationship 2405 stores who a person's boss or superior at the organization is.

Figure 25:
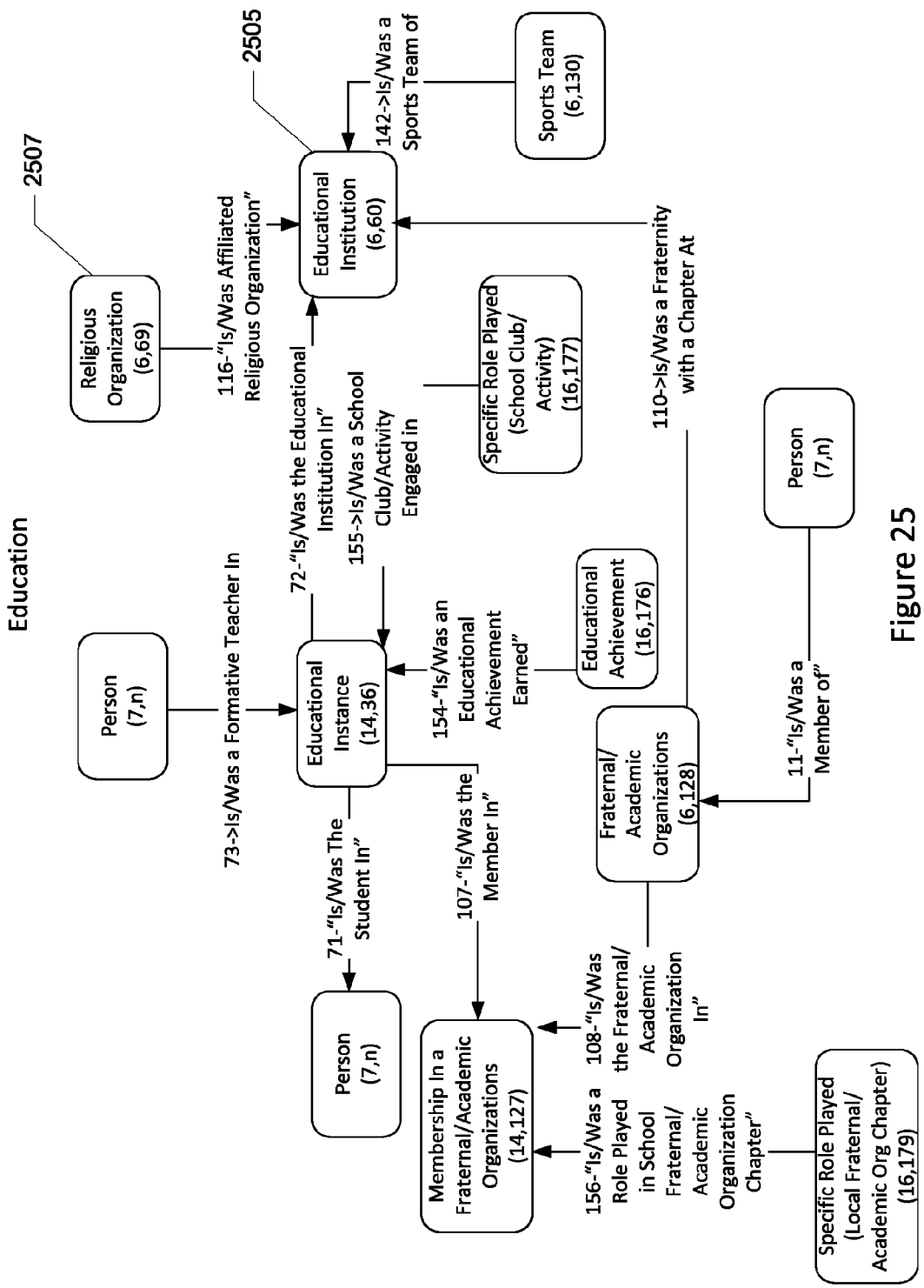
FIG. 25 shows a schema for a person's education.

In an implementation, a person's education is represented by a complex relationship entity. FIG. 25 shows a sample schema for a person's education. This complex entity has attached to it, a person, and an educational institution. Additionally, the membership to a fraternal or academic organization is a complex entity to which a person, and an organization are attached. Other information can be connected to the complex relationship entity for education, fraternal, or academic organization.

In an implementation, to model memberships to fraternities, the system creates a link between the educational instance, and the instance of this person's membership to the fraternal organization. This link or relationship also includes if a person was a member of that organization while they were in school. Additionally, the person has a direct relationship to the membership instance to signify that their membership to this organization exists outside of their time at the university.

In an implementation, the system does not create multiple instances for each chapter of a fraternity; rather a membership to a fraternal organization refers to the entity as a whole and not for each university where it is represented. However, the system does create relationships between the master fraternal organization and the education institution, signifying that a chapter of this fraternity exists at the school. When the system validates the information, membership to a fraternal organization via an educational instance will be rejected if the affiliated education institution does not have a relationship to the fraternity. The system also associates educational institutions 2505 with any affiliated religious organization, such an in item 2507. For example Georgetown University has a "has affiliated religious organization" to the Jesuits.

Figure 26:
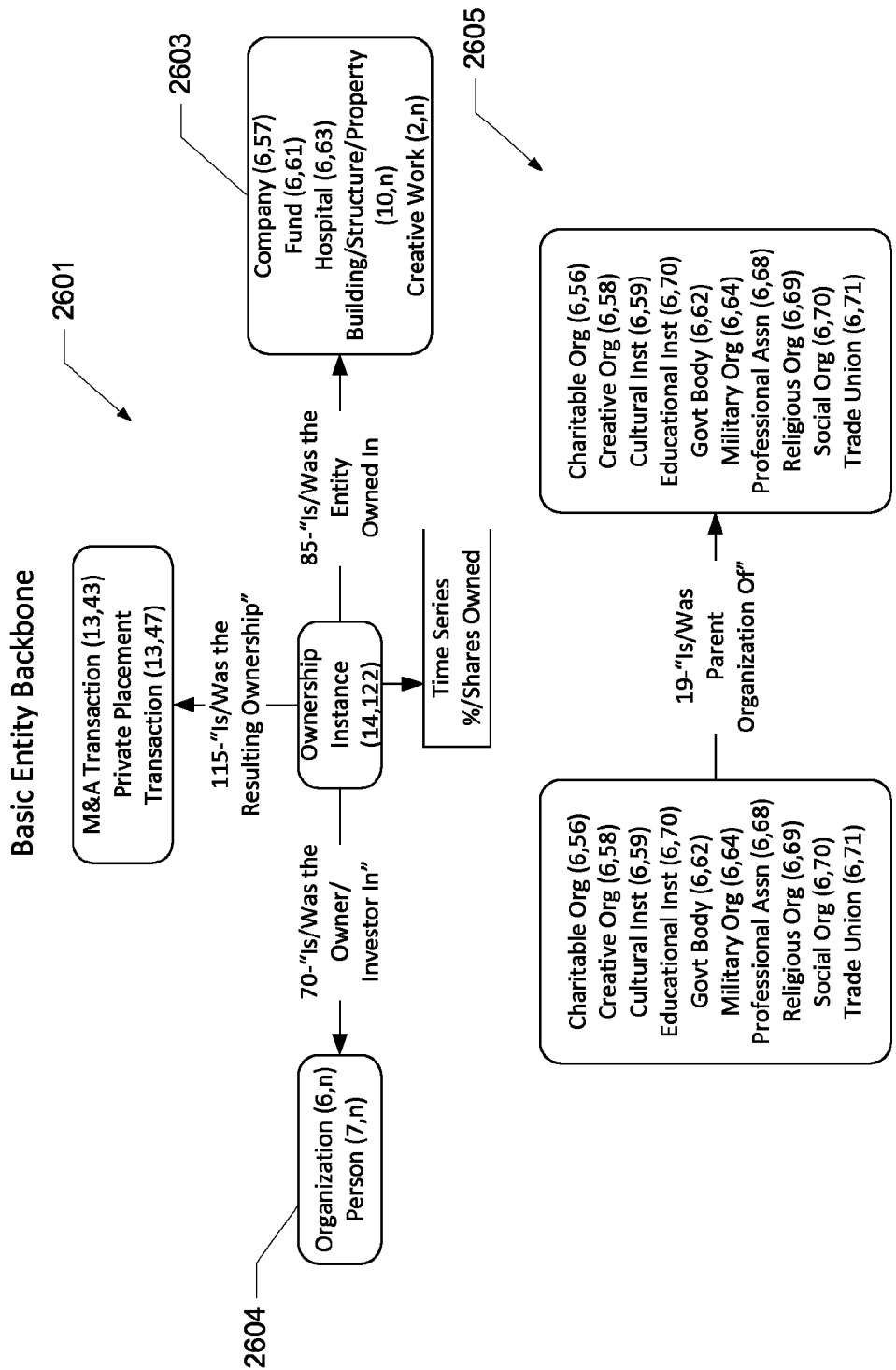
FIG. 26 shows a schema for basic entity backbones.

FIG. 26 shows a schema for basic entity backbones. For example, in sample 2601, ownership is stored as a complex relationship entity. Ownerships can be complicated; for example when representing a resulting ownership of a company in an merger and acquisitions transaction. However, most ownership entities involve two adjacent entities; the owner 2604 and the entity that was owned 2603.

In an implementation, the system does not deal with security/stock ownership because the complexity of this is beyond additional value the system would provide to users. The system can work with other sources of information to provide this information.

In another sample 2605, a relationship "Is/Was Parent Organization Of" is shown. Many different types of entities are possible for both the parent organization and child organization.

Figure 27:
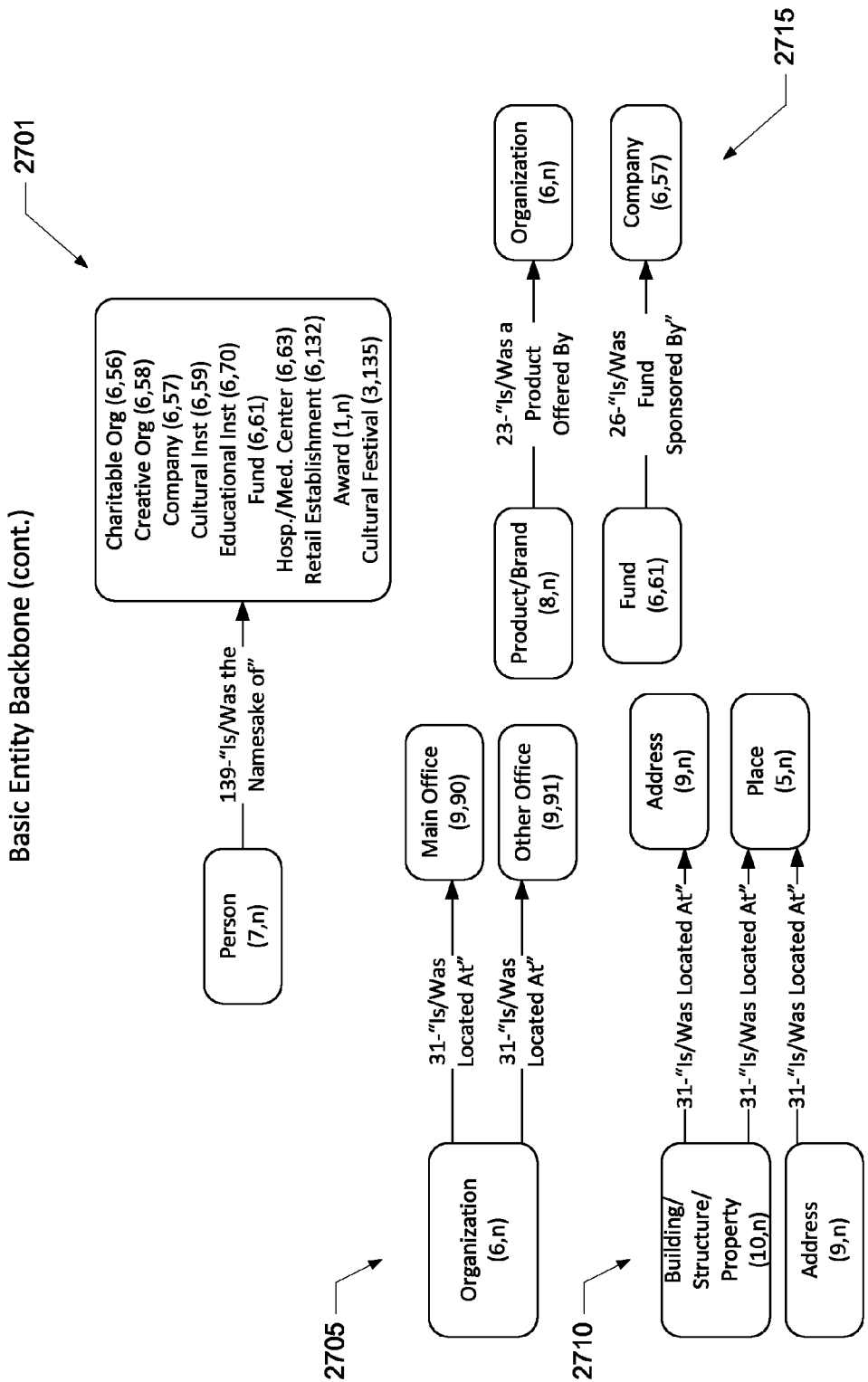
FIG. 27 shows an additional schema for basic entity backbones.

FIG. 27 shows additional sample schema for basic entity backbones. For example, in sample 2701, an entity is named after a person. In another sample 2705, organizations have a "Is/Was Located at" relationship to an addresses related to the organization. Addresses are classified, so for a headquarter location address, the classification of the address entity is "Main Office." For other offices, the classification of the address entity is "Other Office."

In an implementation, all addresses are linked to at least one place entity. In sample 2710, addresses are associated with further information. The address is linked to the most granular place entity that has been provided when the data was entered. Addresses can also be linked to building structure/property/entities if the structure that contains that address has significance and exists in the system as an entity.

In sample 2715, additional information on who funds or offers a product is stored in the system.

Figure 28:
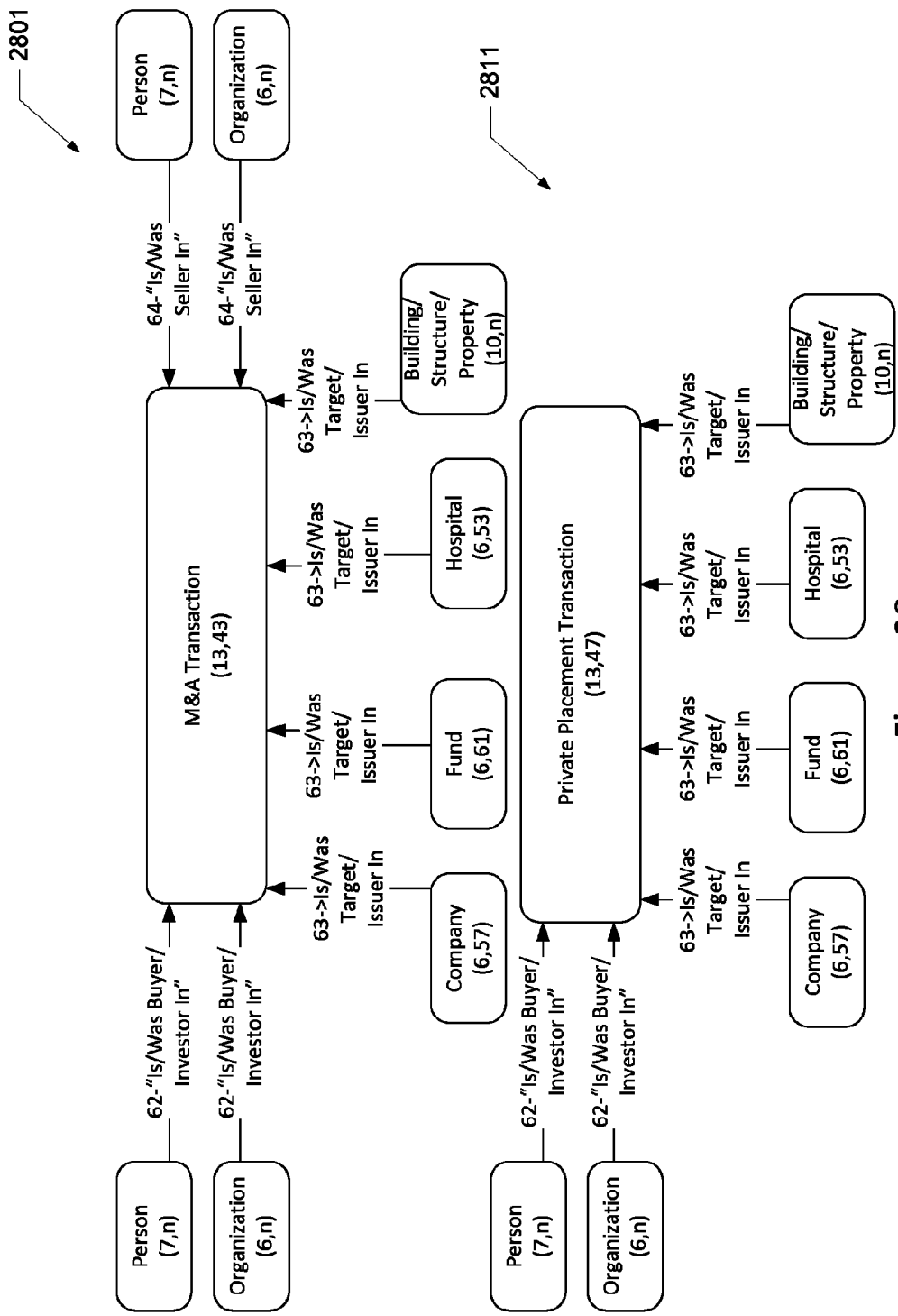
FIG. 28 shows two schemas of a merger and acquisition and a private placement transactions.

FIG. 28 shows two sample schemas of a merger and acquisition 2801, and a private placement 2811 transactions. For a merger and acquisition transaction 2801, they must have a target (or company to be acquired) and a buyer. Some valid types of entities for the seller in these transactions are a person or an organization, but other types of entities are possible. Some valid types of entities for the target in these transactions are a company, fund, hospital, or building/structure, but allowing people or organizations can be the seller or the buyer in a transaction.

For a private placement transactions 2811, the system can store information on the transaction including seed investments, venture rounds, or anything in which new stock or value is being generated by means of this investment. A difference between the merger and acquisition 2801, and the private placement 2811 transactions is that in a private placement transactions there is no seller. This assumes that since money coming in is creating new stock, there would be no stock to sell. Private placement transactions can also include initial public offerings (IPOs), which create new stock.

Figure 29:
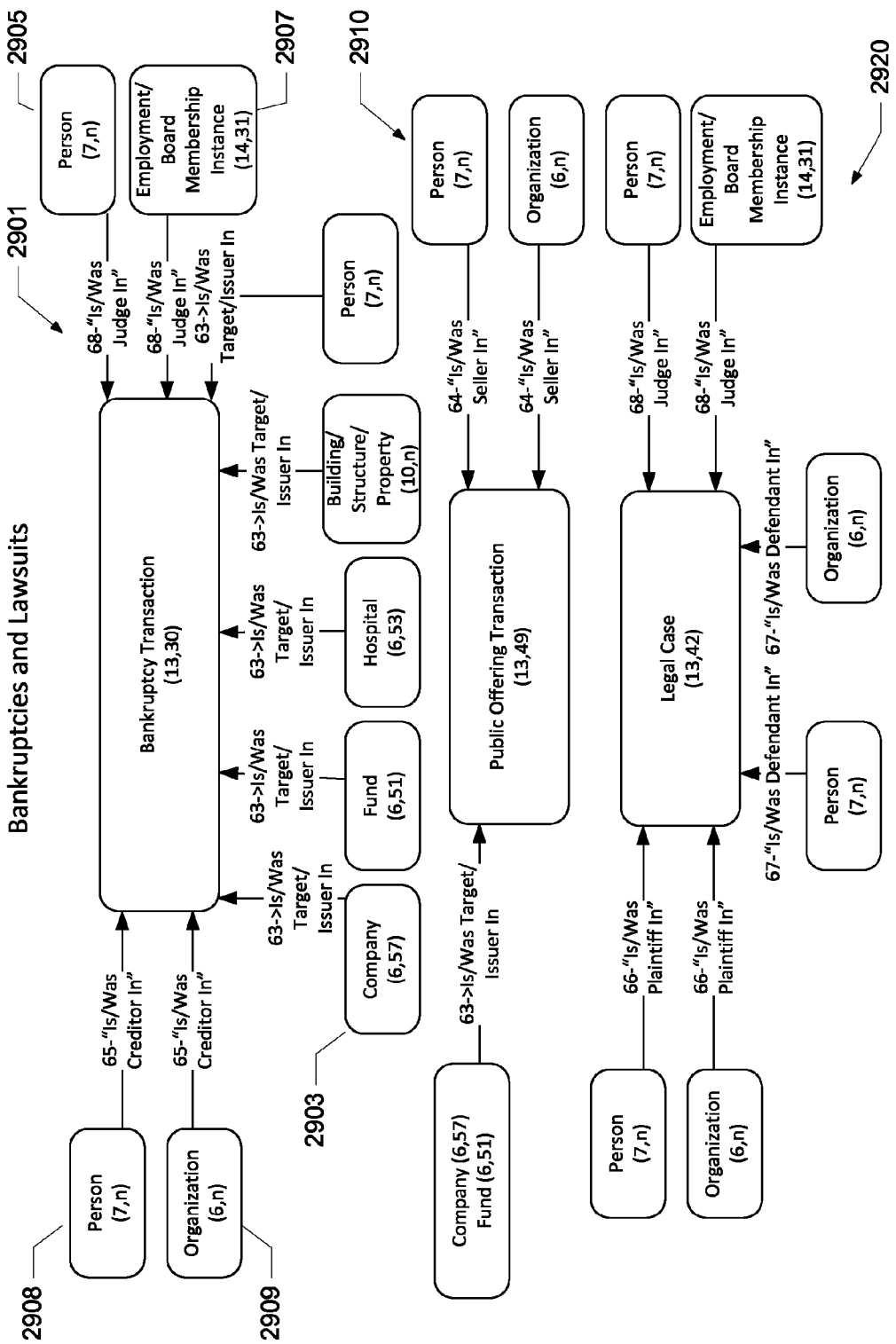
FIG. 29 shows three schemas for bankruptcy, public offering, and lawsuit transactions.

FIG. 29 shows three schemas for transactions. In sample transaction 2901, a bankruptcy is shown. Bankruptcies share many similarities with other types of transactions in the system. Like other transactions, there is a target (the entity going bankrupt, reference item 2903) either a judge (reference item 2905), or an employment instance (the judge's employment in the court, reference item 2907), and the person (reference item 2908) or organization (reference item 2909) who is the creditor. In sample transaction 2910, a public offering transaction is shown.

The system classifies legal cases as transactions because they have similar properties and associated relationships with more traditional transactions. In sample transaction 2920, a legal case is shown. A person or an organization can be either the plaintiff or the defendant, and the presiding judge can either be a person directly, or a person's employment as a judge.

Furthermore, returning back to FIGS. 26 and 27 with sample entity backbones, a legal case can result in an ownership instance. For example, in the case where a divorce case leads to the transfer of assets from one person to another, a new ownership instance will be created as a result of this transaction.

The system can track different types of advisory relationships for a transaction. Advisory relationships often have tiers of complexity. For example, an investment bank can advise a target on a merger and acquisitions transaction, and that investment bank may hire an outside counsel in an advisory role.

Figure 30:
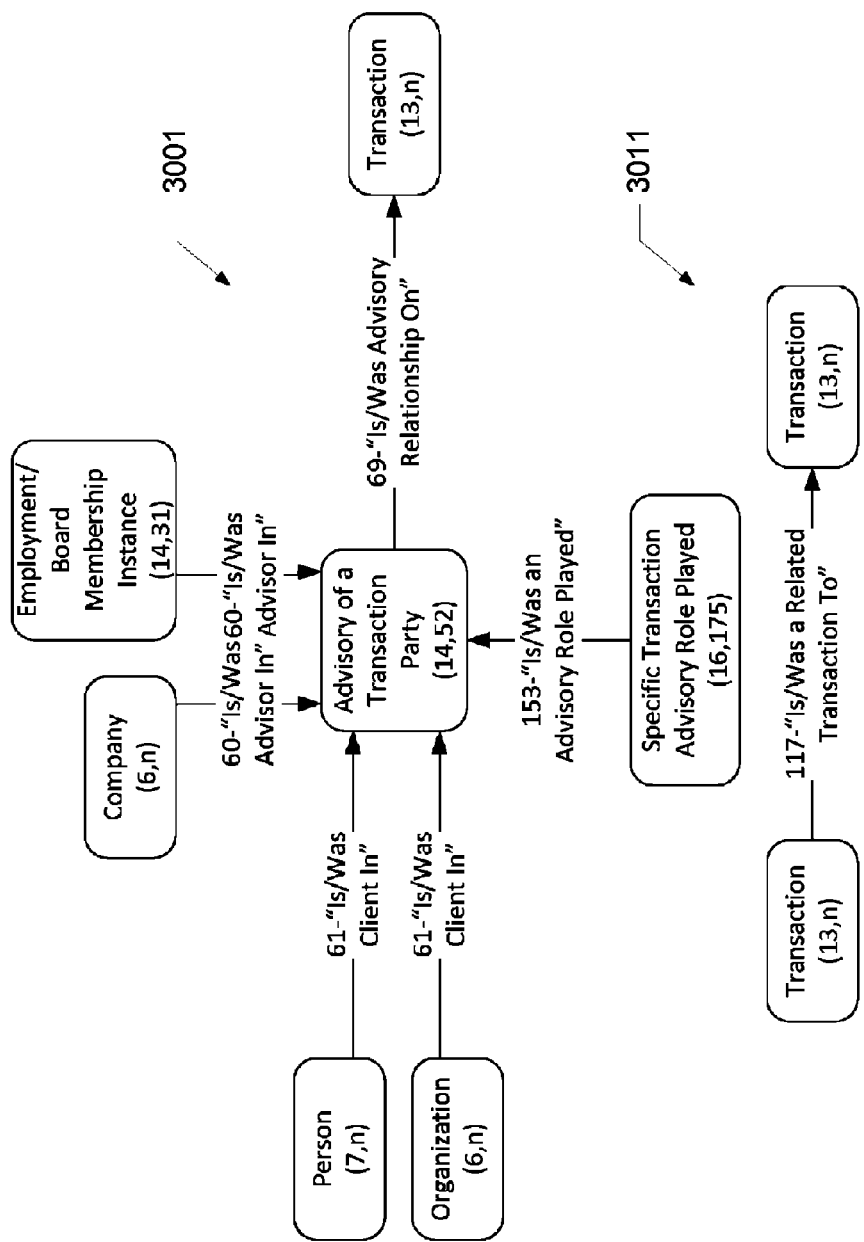
FIG. 30 shows a schema for a transaction advisor and related transactions.

FIG. 30 shows sample schema for a transaction advisor and related transaction relationship. In sample transaction 3001, the advisor is a complex entity, and this entity is always related to the transaction directly. Either a person or an organization can be the client of an advisory instance. The advisor in an advisory instance can either be a company or an employment instance. The system does not allow a person to be directly connected to an advisory role, rather this person must first be connected to their employment instance, and the employment instance is connected to the advisory instance. In sample transaction 3011, the system tracks related transactions. For example, for large companies, related transactions can include transactions with subsidiaries, parent companies, or other related transactions.

Figure 31A:
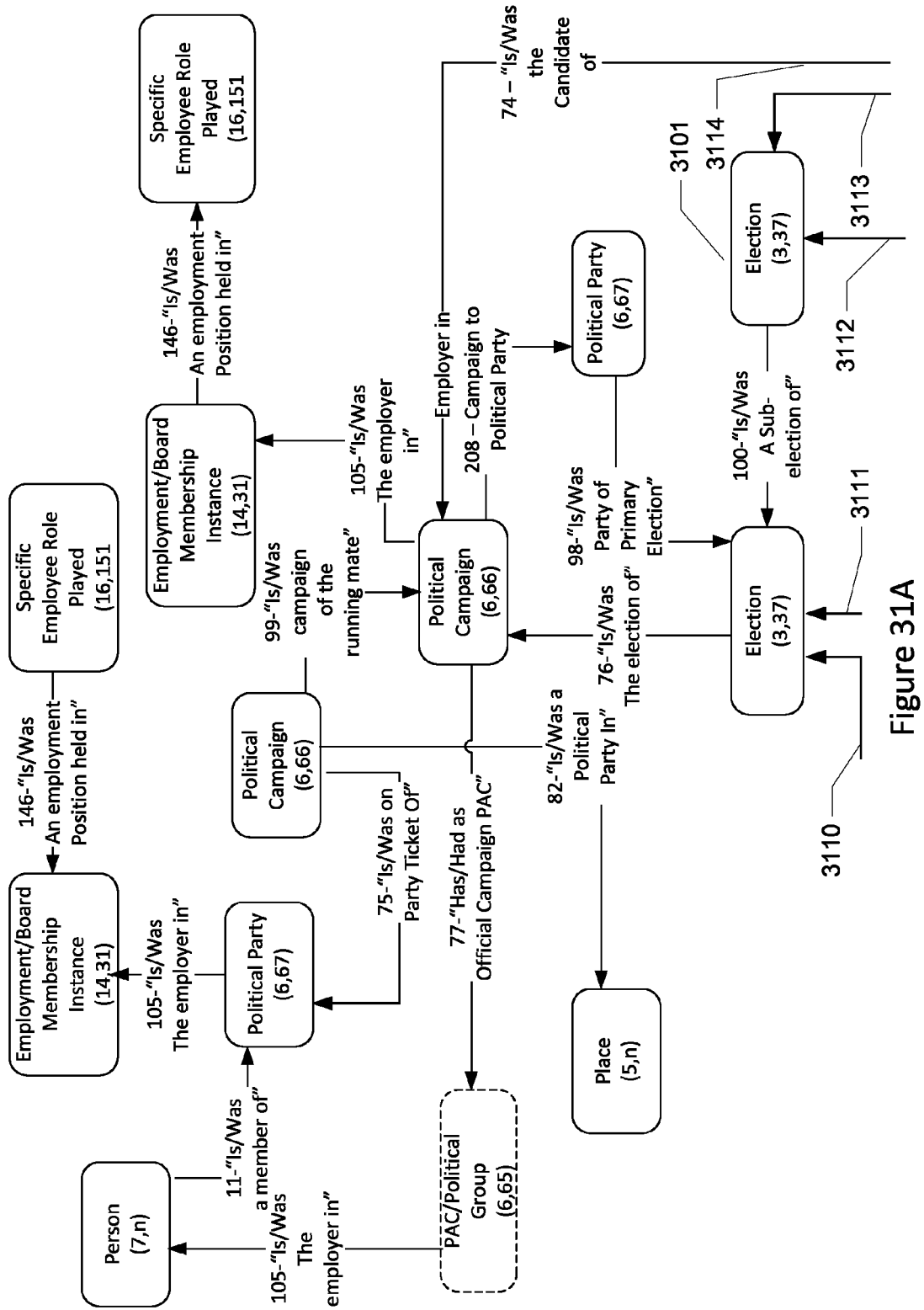
FIGS. 31A and 31B show a schema for politics and elections.
Figure 31B:
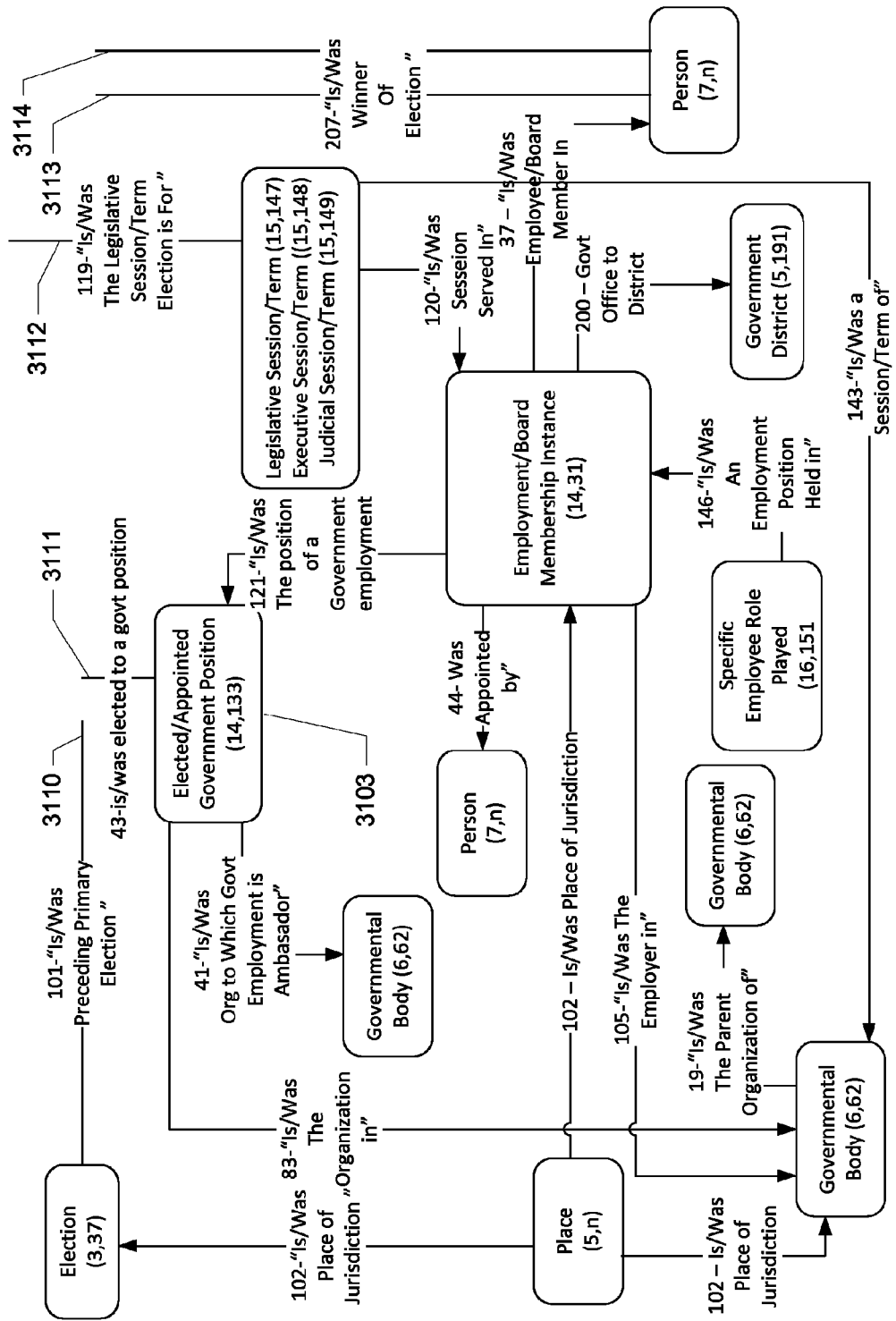

In an implementation, the system tracks interactions between various areas of the government. FIGS. 31A and 31B show a schema for politics and elections of the system. As mentioned elsewhere, political donations are valid when made to a political action committee or PAC. The PAC is related to a campaign, and multiple campaigns can be related to an election. Elections can have sub elections 3101, an election for a position in a district 3103, to a congressional election, or a general election to a primary. A primary election, a place, or a political campaign can be related to a political party. Reference numbers 3110, 3111, 3112, 3113, and 3114 indicate lines which continue on FIGS. 31A and 31B.

In an implementation, specific positions in government like "The President of the United States" are their own entities. These entities are related to the election to which they are held for, to the place of jurisdiction, and a government body to which they represent.

When a government employment begins, (after an election, appointment, or a traditional hire), a "Employment Instance" is created. This entity is related potentially to the election that lead to it, the position entity, the government body, the place of jurisdiction, and the person who held it. Furthermore a government instance can be related to a number of legislative sessions, as well as the person who appointed that position.

If a politician sits on a committee or a sub committee, there is another employment instance created. This entity is connected to the person, the committee, and the appropriate sessions. Furthermore a government organization can be related to a parent organization by the "Is/Was Parent Organization Of" edge or relationship.

Figure 32:
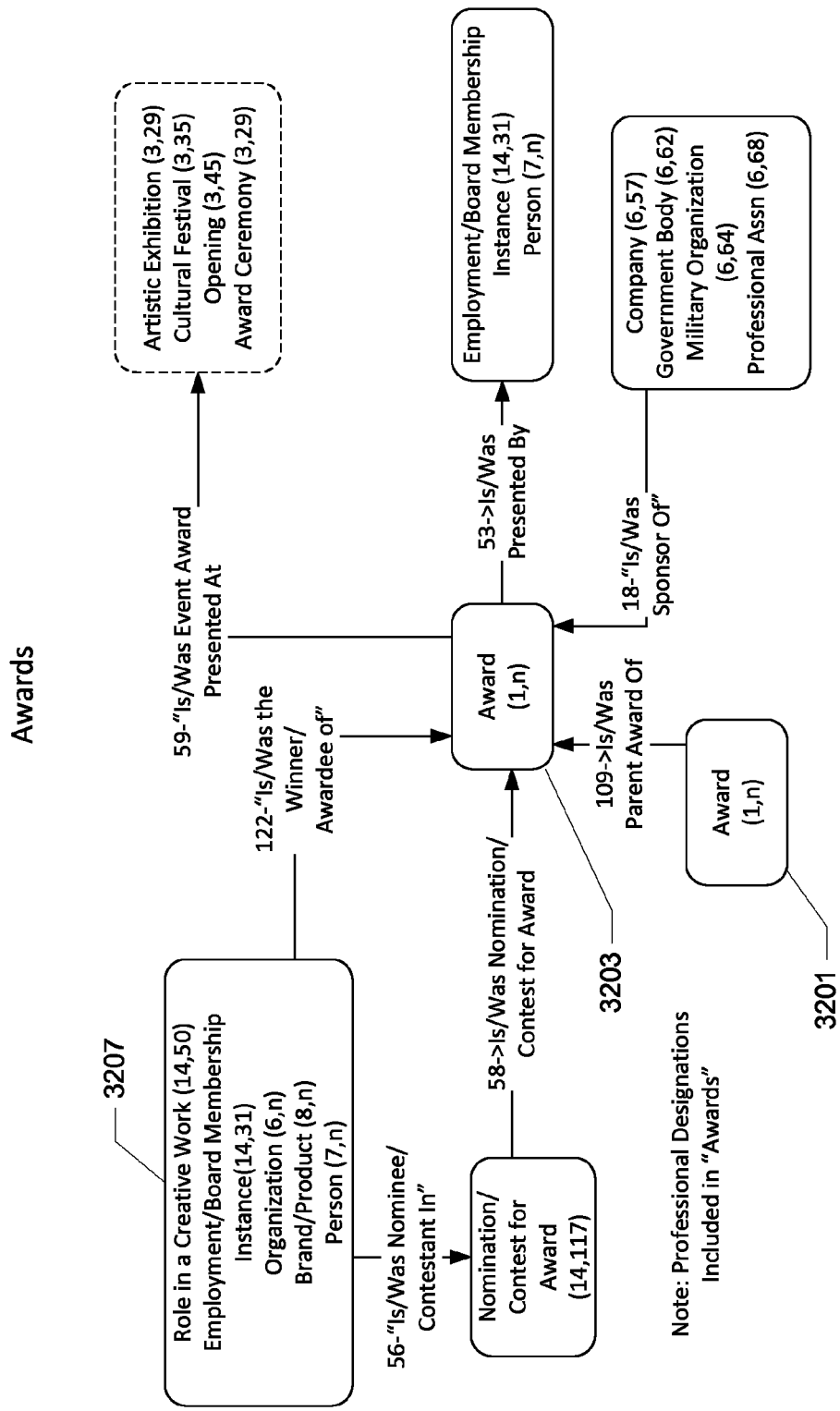
FIG. 32 shows a schema for awards.

In an implementation, awards have parent awards connected by the "Is/Was Parent Award Of" relationship type. FIG. 32 shows a sample schema for a awards relationship. Some awards 3203 of the system can be awards related to other awards 3201. For example, Academy Award for Best Picture is connected to the Academy Awards by the "Is/Was Parent Award Of" Relationship Type. Awards of the system can also be associated with a location by a "Is/Was Event Award Presented at" relationship type. Awards can be won by simple entities, a person, a product, an organization, a product, or by a complex entity a role in a creative work, or an employment instance as shown in 3207.

In an implementation, when someone wins an award on behalf of another entity, the award will be attached to a complex entity connecting the person who won and the entity its award was won on behalf of. For example, if an actor wins an award for their performance in a creative work, then it is not the person that wins the award; rather it is the complex relationship, their performance in the creative work that wins the award. Additionally, nominations for awards are dealt with via complex entities. In an implementation, the awards structure can store professional designations.

Figure 33:
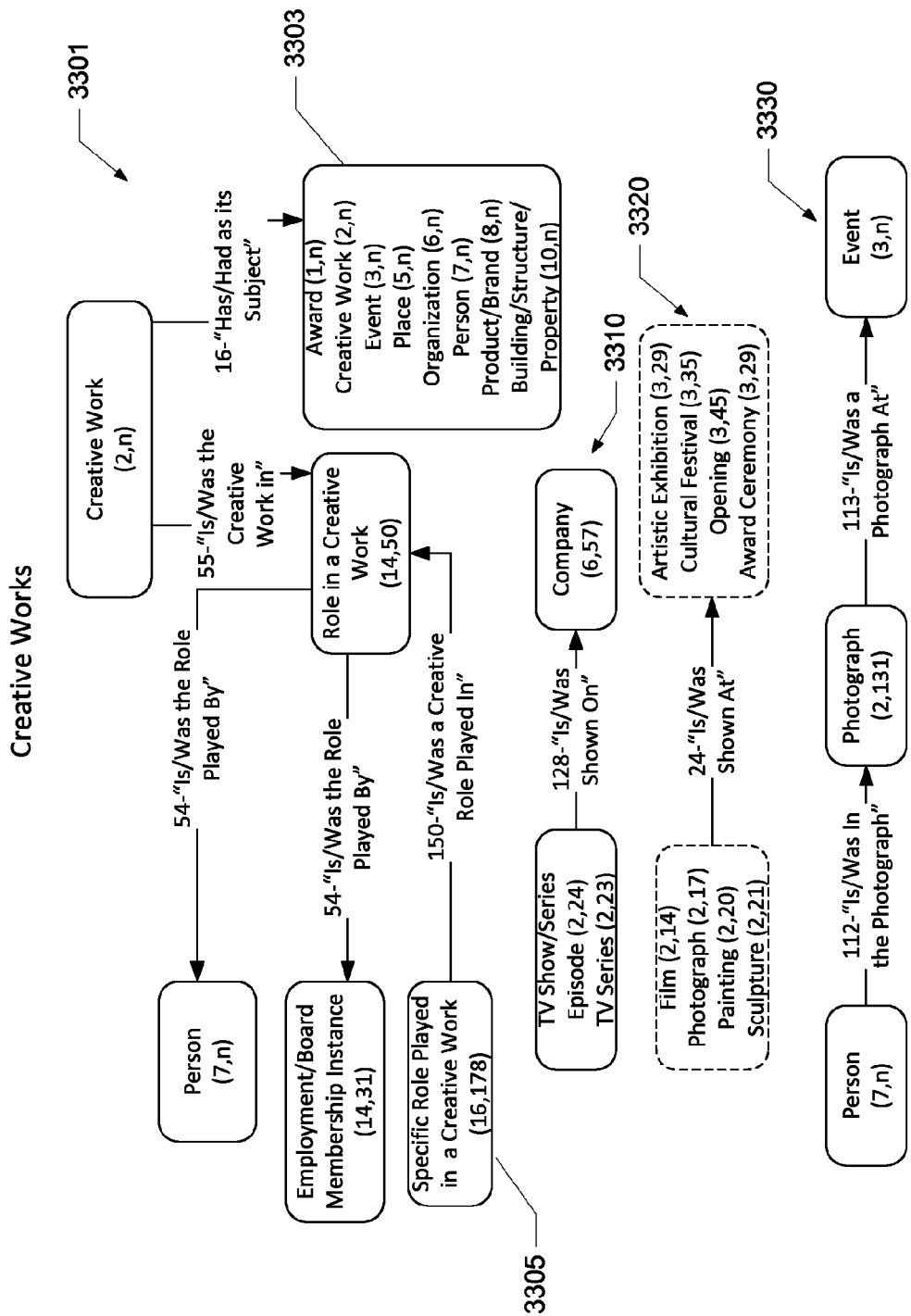
FIG. 33 shows a schema for creative works.

FIG. 33 shows a sample schema for a creative works relationship. Creative works can have any type of entity being it's subject. In sample creative work 3301, this relationship is expressed via the "Has/Had As It's Subject" relationship type connected to 3303. Whenever a person is related to a creative work, they are not related directly, rather the person is connected through a complex entity of type [Specific Role Played in Creative Work] 3305 to which the creative work itself is connected. In the instance when a person has a role in a creative work on behalf of a company (a film producer working on behalf of a production company), their employment instance is connected to the role in the creative work.

In sample creative works 3310 and 3320, creative work that is shown or displayed is connected to a location via a "Is/Was Shown At" relationship type. This would be applicable, for example, for a painting that was shown at a particular gallery.

In sample creative work 3330, a photograph is stored in the system. Photographs in the system's ontology are significant because they can be powerful in the way they connect people. Often times, two or more people are photographed together at a high profile event. The system stores this data such that the photograph is connected to the event with the "Is/Was A Photograph At" relationship type, and each person in the photograph has a relationship type of "Is/Was In The Photograph" to the photograph. When more than one person is in the photograph, the system can use a Path Types table (see below) to generate relationships between the people in the photograph.

In an implementation, a main entity graph of the system is organized by the type system/reference data ontology described above. Additionally, specific types (e.g., reference data items), are organized into concepts. Some concepts can come from: entity classifications, relationship types, entity attribute values, and relationship attribute values. Some systems (e.g., RDF-based systems) store the same concepts in a multitude of different ways. The system however, uses duplicate values in our reference data in order to enforce validation. For example, in an RDF store, the value "French" would appear the same in the following two instances: Entity Attribute; Person A [Knows Language] French; Relationship Attribute; and Person A's Education Instance [Major] French. The node for "French" means the same thing in an RDF store, but for the system, the data model creates two different identifier's for "French" when it is used in different contexts. Since the system's data model is designed to enforce data integrity with validation table, it makes more sense to create different identifiers for "French" depending on the context and enforce validation on those values.

However, the constraints of a validation based ontology become restrictive when generating influence rankings and relationships between nodes in our graph. In order to increase the flexibility of what the system is capable of doing, the system uses a concepts ontology. The concepts ontology can be thought of as a meta-ontology that sits above the reference data discussed above in this document. Reference data is linked to the concepts ontology by tying like reference data items together.

Using the example for French given above, the system creates a value in an EntityAttributeValues for [French] valid only for the EntityAttributeType of "Knows Language." Additionally, the system creates a value in RelAttributeValues for [French] which is only valid for the RelAttribute of [Major]. The system also creates a record in the concepts to Ref Data table where the concept of French is related to both the value in Role Detail value and the Entity Attribute Value, so that the concept is linked with its related items. Tables 12-17 show an implementation in table format for the example given above.

TABLE 12

RelationshipAttributeTypes

| ID | Name |
|---|---|
| 10 | Major |

TABLE 13

EntityAttributeTypes

| ID | Name |
|---|---|
| 110 | Knows Language |

TABLE 14

EntityAttributeValues

| ID | Name | Valid for EntAttribute |
|---|---|---|
| 210 | French | Knows Language |

TABLE 15

Rel Attribute Values

| ID | Name | RoleDetail |
|---|---|---|
| 1010 | French | Major |

TABLE 16

Ref to Concepts

| ID | RefTable | RefID | ConceptID |
|---|---|---|---|
| 4001 | EntityAttibuteValues | 210 | 5000 |
| 4002 | RelAttributeValues | 1010 | 5000 |

TABLE 17

Concepts

| ID | Concept |
|---|---|
| 5000 | French |

While this may seem like a more complicated way to store this information, the system uses this as a means to connect two multiple pieces of information together. The system's core ontology is better for developing data entry applications and enforcing data integrity with validation, so from a business perspective, tying together abstract concepts is not of as high priority as is creating a sound backend data structure. However, the concepts ontology allows the system to create these links as a meta ontology on top of the system's core reference data.

In an implementation, the system uses the concepts ontology for overlapping interests. For example, a user of the system may want to know how they may be able to connect to a person through the interests that they have. Very rarely will two people have in the database a link to the same interest identifier. Rather, they may have expressed interest in an organization, or a creative work that is similar to something the profiled person has expressed interest in. Consider the example in which Person A is interested in a broader category of something, while Person B is interested in a specific instance of a creative work that falls into the same category. For example: Person A is interested in Film Noir; Person B likes "Chinatown;" and Chinatown has Genre Film Noir. The system can determine that Person A and Person B have a connection in that they both have expressed an interest in Film Noir.

In some systems, the node for "Film Noir" would be the same when being referenced by an interest attribute or a genre attribute. But, in an implementation, the system will separate these values such that the value of "Film Noir" is referred to by the Interest Attribute, which is different than the genre attribute. In order to tie these nodes back together we connect them via the concepts ontology. Tables 18-24 show an implementation in table format for the example given above.

TABLE 18

Entities

| ID | Name |
|---|---|
| 1 | Person A |
| 2 | Person B |
| 3 | Chinatown |

TABLE 19

EntityAttributeTypes

| ID | Name |
|---|---|
| 101 | Genre |
| 102 | Interested in |

TABLE 20

Relationships

| ID | E_0 | RelType | E_1 |
|---|---|---|---|
| 201 | Person B | likes | Chinatown |

TABLE 21

Relationships Table

| ID | EntityID | EntityAttributeType | Value |
|---|---|---|---|
| 2001 | 1(Person A) | 102(InterestedIn) | 1001(Film Noir) |
| 2002 | 3(Chinatown) | 101(Genre) | 1004(Film Noir) |

TABLE 22

EntityAttributeValues

| ID | Name | Valid for EntAttribute |
|---|---|---|
| 1001 | Film Noir | 102 (InterestedIn) |
| 1002 | Baseball | 102 (InterestedIn) |
| 1003 | Kayaking | 102 (InterestedIn) |
| 1004 | Film Noir | 101 (Genre) |
| 1005 | Comedy | 101 (Genre) |

TABLE 23

Ref to Concepts

| ID | RefTable | RefID | ConceptID |
|---|---|---|---|
| 2001 | EntityAttributeValues | 1001 (Film Noir) | 3001 (Film Noir) |
| 2002 | EntityAttributeValues | 1004 (Film Noir) | 3001 (Film Noir) |

TABLE 24

Concepts

| ID | Concept |
|---|---|
| 3001 | Film Noir |
| 3002 | Music |

Since the concept of film noir now links the appropriate entity attribute values in the system, the system can determine there is a following relationship between Person A and Person B: Person A --- {Has interest} ----> Film Noir ---- {Has Concept} ---> Film Noir <--- {Has Concept} --- Film Noir <---- {Has Genre} ---- Chinatown <---- {likes} Person B In an implementation, the system can reverse engineer concepts with ranked lists. This allows the system to produce influence metrics based on abstract domains. For example: Show me the most influential people in music. Other system may do this, but their judgments are subjective while the system determines this quantitatively. This uses the concepts ontology which is in essence a meta-ontology that sits on top of our master ontology (reference data). The system can apply a bias to the graph to take into account a person's influence on a domain by creating a direct edge from the person to the concept and adding to it a weight. In doing this, when calculating influence in the graph, this edge will increase a person's influence on a particular domain and, in addition, this influence will ripple out through the graph to the entities surrounding this person.

One of the pieces of information the system captures and stores are "Ranked Lists," which are classified as [Awards]. Some of these lists can apply to more concrete things such as "The Richest People in the U.S." or more abstract things such as "The most influential people in Music." This information is useful for at least two reasons: (1) it is useful to display for a user of the system; and (2) helps the system refine calculations on the influence on a domain. These lists are written and published by people who know the space very well, and who have made educated decisions in ranking these entities the way they do. In order to make best use of these lists for influence calculations, these ranked lists interact with our concept ontology.

Take for example a list published by Magazine A for the "Most Influential People in Music." The system can also generate a result based on this query, so the system uses the list from Magazine A as an input and adjusts the influence metrics that define our concept rankings. The list has an abstract concept to which it is attributed "Music." Just like how the system increases (or bumps up) the weights that people have in domains by attaching a weighted edge to the concept, the system attaches this list or award to the concept of "Music" with a particular weight. The people who are on the list have a weight attached to the list itself corresponding to their rank on the list. When traversing the edges between the person and the list, the list and the concept will increase the influence of the person over the concept.

In an implementation, concepts can be further adapted to include more or fewer items. Adjusting what is included in the concepts allows the system to change according to the needs of its users. Adjustments in the concepts ontology are flexible since tying things together via concepts insulates them from the master code base.

In an implementation, the system's ontology uses paths. A paths table that stores paths can provide for n number of edges. Paths are used to compare and link different combinations of relationship types as one. Paths have at least three functions: (1) Closure in relationships; (2) Fill holes of data in the system; and (3) Represent complex relationships as simple paths. These functions are discussed separately, following. Table 25 shows an example of paths of the system in table format.

TABLE 25

(columns 1-7)

| ID | SameAs RelType | RelType_0 | Dir_0 | RelType_1 | Dir_1 | RelType_2 |
|---|---|---|---|---|---|---|
| 1 | Null | 37>>Is/Was Employee In | out | 83>>Is/Was the Company In | in | |
| 2 | Null | 70>>Is/Was Owner/Investor In | in | 85>>Is/Was Entity Owned In | in | |
| 3 | 8>>Is Grandparent Of | 4>>Is Parent of | out | 4>>Is Parent of | out | |
| 4 | Null | 37>>Is/Was Employee In | out | 83>>Is/Was the Company In | out | 83>>Is/Was the Company In |

TABLE 25-continued (columns 8-11)

| Dir_2 | RelType_3 | Dir_3 | Text |
|---|---|---|---|
| out | 37>>Is/Was Employee In | out | Works For |
| | | | Owns |
| | | | Grand |
| | | | Parent |
| | | | Works |
| | | | with |

In an implementation, the system represents complex relationships as simple. The system can store things in the graph as multihop paths that traverse through a complex relationship node. These relationships are best presented to the user as a direct binary relationship and the paths construct allows us to present this information efficiently to a user. For example, the system does not display to the user: "John Doe is the employee in John Doe's Employment Instance with Company A and Company A is the company In John Doe's Employment Instance with Company A." Rather the system displays: "John Doe works for Company A." Although complex relationship entities exist in the system, paths allow the system to normalize them so that the user is insulated from their complexity. For example, see path with ID 1 in table 25.

In an implementation, the system shows closure in relationships. The system provides to a user information about important people as well as paths on how to reach them. To the user it is extremely valuable to know that two people work together at a firm. However to store all of the co-worker relationships as direct edges would be a monumental data storage challenge. Rather than storing all as direct relationships, the system uses paths to determine these relationships on the fly.

Assume that a user (User A) wants to know how they are connected to a profiled person (Person B). The system queries the graph by asking "Show me the paths between User A and Person B. Assume further that User A and Person B worked together in the past at Company C." a resultant path generated is path with ID 4 in table 25. The application can define that path according to this record in the paths table and return it to the user in an elegant and concise textual representation (e.g., there is a path between User A and Person B through Company C). Paths allow the system to elegantly calculate graph closure, and increase the virtual size of the system's database without increasing the amount of data that is actually stored. In an implementation, the system uses paths to fill holes in the system's data. When information is entered into the system, say an employment instance, the system hides the fact that the information they are entering is complex. For example, the user would enter a piece of employment information as A --- Works for ---> Company B. When that piece of information is saved, the system knows that the information corresponds to the path with path ID 1, and that E_1 (entity 1) is person A and E_5 (entity 5) is Company B. This means that the system knows that it has to create a complex entity as E_2 to create the three appropriate relationships between these entities.

Another instance of how paths help fill holes can be explained via the "grandparent" example. Consider path with path ID 3 in the table above. This path specifies that if E_1 is Parent of E_2 and E_2 is parent of E_3 that we can deduce on the fly without actually storing the information in the database that E_1 is the grandparent of E_3. As mentioned prior, the paths construct allows the system to present to the user the closure of the graph as defined relationships, without putting our system through the stress of having to store this information. On the other hand, to a data operator who is entering data into the system, when all of the steps in a particular path are not known they can still enter the information for what they know. So if the operator sees: "A is the Grandfather of C," the system does not require the operator to find the person in the middle of the relationship to enter that information. Rather, the system provides to the data operator a dropdown in which they select what they see.

In an implementation, there is an information "SameAsRelType" associated with a path. In table 25, the path with path ID 3 specifies that the two hop path ("is parent"-"is parent") is the same is the one hop path "Is Grandfather." For a data operator, who enters this information, A is the grandfather of C. Using the paths table, the system can generate a work item in a queue for a secondary research team to fill in the missing link in the path. a query can be generate using the following query in table 26:

TABLE 26

Select * from Relationships_Table where
RelationshipTypeID in
(select distinct SameAsRelType from Paths_table)

This query generates a list of relationships that a user entered are actually indirect and require further research to determine the associated direct relationships. For example, the data operator would see the following: "A is the Grant Parent of C; Who is the parent of C who is also the child of A?" When the data operator replies to this prompt, the original relationship is deleted, and the two relationships that define the path take its place. Now the data is more complete, and the user sees exactly the same information.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
    crawling a network of unstructured information data sources by a system to obtain crawled information;
    filtering the crawled information according to an ontology data model to create ontology data structures;
    storing the ontology data structures on a server;
    providing a social graph, wherein the social graph comprises:

a plurality of nodes of a first type, referred to as system-provided nodes, wherein each system-provided node represents an entity and includes the crawled information gathered by the system from the crawling the network of unstructured information data sources by the system;

a plurality of nodes of a second type, different from the first type of node and referred to as ghost nodes, wherein each ghost node represents an entity created for a user and includes user information specified by the user of the system;

a plurality of edges of a first type, referred to as system-provided edges, wherein each system-provided edge represents a relationship between two different system-provided nodes of the social graph and includes a relationship type determined by the system from the crawled information; and a plurality of edges of a second type, different from the first type of edge and referred to as ghost edges, wherein each ghost edge represents a relationship between a system-provided node and ghost node of the social graph, and information on the relationship is specified by a user of the system;

in the social graph, providing a first system-provided node and a second system-provided node;

altering the social graph based on the ontology data structures comprising creating a first system-provided edge coupling the first system-provided node to the second system-provided node to represent a relationship specified by a first ontology data structure of the ontology data structures; and providing a graphical user interface through which users, each being represented by a ghost node in the social graph, can access the first and second system-provided nodes in the social graph along with a visual indication of the relationship specified by the first ontology data structure.

2. The method of claim 1 comprising:

an ontology data model associated with events comprising:

a plurality of entity types comprising an event entity type, a person entity type, an award entity type, a creative work entity type, a place entity type, a cultural event entity type, a graduation ceremony event entity type, and a company entity type; and a plurality of relationship types to interconnect the entity types comprising an attendee of relationship type can be used to connect the person entity type to the cultural event entity type, a performer at relationship type can be used to connect the person entity type to the cultural event entity type, an award presented at relationship type can be used to connect the award entity type to the cultural event entity type, a was held at relationship type can be used to connect the graduation ceremony event entity type to the place entity type, a has as its subject relationship type can be used to connect the creative work entity type to the cultural event entity type, and a sponsor of relationship type can be used to connect the company entity type to the cultural event entity type.

3. The method of claim 1 comprising:

an ontology data model associated with donations comprising:

a plurality of entity types comprising a person entity type, a recipient organization entity type, and an organization entity type; and a plurality of relationship types to interconnect the entity types comprising a donor of relationship type can be used to connect the person entity type to the recipient organization entity type, and the donor of relationship type can be used to connect the organization entity type to the recipient organization entity type.

4. The method of claim 3 wherein the entity types comprise a marriage to spouse entity type and the relationship types comprise a marriage of relationship type can be used to connect the person entity type to the marriage to spouse entity type, and the donor of relationship type can be used to connect the marriage to spouse entity type to the recipient organization entity type.

5. The method of claim 4 wherein the social graph includes:

a first piece of crawled information represented in the social graph using the ontology data model associated with donations, including a first person entity and a first recipient organization entity, coupled to each other in the social graph by a connection of the donor of relationship type;

a second piece of crawled information represented in the social graph using the ontology data model associated with donations, including a second person entity and the first recipient organization entity, coupled to each other in the social graph by a connection of the donor of relationship type; and a third piece of crawled information represented in the social graph using the ontology data model associated with marriage, including first and second person entities, coupled to each other in the social graph by a connection of the marriage of relationship type; and wherein the graphical user interface allows a user of the system to view donations associated with the first entity comprises:

determining the first and second entities are connected based on the third piece of crawled information, coupling the first and second person entities by the connection of the marriage of relationship type; and retrieving from the social graph the stored first and second crawled information associated with donations, coupling the first and second person entities to the first recipient organization entity by the connection of the donor of relationship type.

6. The method of claim 3 wherein the recipient organization entity type comprises a political organization entity type and a charitable organization entity type.

7. The method of claim 1 wherein the ontology data structures comprise an entities table and a relationships table, wherein the entities table comprises rows and columns, each row having a first column storing a first identifier and a second column storing a first entity name, each row storing an entry in the entities table, the relationships table comprises rows and columns, each row having a first column storing a second identifier, a second column storing a second entity name, a third column storing a relationship type, and a fourth column storing a third entity name, each row storing an entry in the relationships table, and a entry in the relationships table comprises second and third entity names selected from the second column of the entities table.

8. The method of claim 1 comprising:
an ontology data model associated with graduation ceremonies comprising:
a plurality of entity types comprising a graduation ceremony event entity type, a person entity type, an award entity type, a creative work entity type, a place entity type, and an educational institution entity type; and
a plurality of relationship types to interconnect the entity types comprising
an attendee of relationship type can be used to connect the person entity type to the graduation ceremony event entity type,
a speaker/panelist relationship type can be used to connect the person entity type to the graduation ceremony event entity type,
a performer at relationship type can be used to connect the person entity type to the graduation ceremony event entity type,
an award presented at relationship type can be used to connect the award entity type to the graduation ceremony event entity type,
a was held at relationship type can be used to connect the graduation ceremony event entity type to the place entity type, and
a has as its subject relationship type can be used to connect the creative work entity type to the graduation ceremony event entity type.

9. The method of claim 1 comprising:
an ontology data model associated with cultural events comprising:
a plurality of entity types comprising a cultural event entity type, a person entity type, an award entity type, a creative work entity type, a graduation ceremony event entity type, a place entity type, and a company entity type; and
a plurality of relationship types to interconnect the entity types comprising
an attendee of relationship type can be used to connect the person entity type to the cultural event entity type,
a speaker/panelist relationship type can be used to connect the person entity type to the cultural event entity type,
a performer at relationship type can be used to connect the person entity type to the cultural event entity type,
an award presented at relationship type can be used to connect the award entity type to the cultural event entity type,
a was held at relationship type can be used to connect the graduation ceremony event entity type to the place entity type,
a has as its subject relationship type can be used to connect the creative work entity type to the cultural event entity type, and
a sponsor of relationship type can be used to connect the company entity type to the cultural event entity type.

10. The method of claim 1 comprising:
an ontology data model associated with party events comprising:
a plurality of entity types comprising a party event entity type, a person entity type, a creative work entity type, a place entity type, an award entity type, a graduation ceremony event entity type, and a company entity type; and
a plurality of relationship types to interconnect the entity types comprising
an attendee of relationship type can be used to connect the person entity type to the party event entity type,
a speaker/panelist relationship type can be used to connect the person entity type to the party event entity type,
a performer at relationship type can be used to connect the person entity type to the party event entity type,
an organizer of relationship type can be used to connect the person entity type to the party event entity type,
an award presented at relationship type can be used to connect the award entity type to the party event entity type,
a was held at relationship type can be used to connect the graduation ceremony event entity type to the place entity type,
a has as its subject relationship type can be used to connect the creative work entity type to the party event entity type, and
a sponsor of relationship type can be used to connect the company entity type to the party event entity type.

11. The method of claim 10 wherein the entity types comprise an organization entity type and the relationship types comprises
a held for the benefit of relationship type can be used to connect the organization entity type to the party event entity type.

12. The method of claim 1 comprising:
an first ontology data model associated with events comprising:
a plurality of entity types comprising a event entity type, a person entity type, an award entity type, a creative work entity type, a cultural event entity type, a graduation ceremony event entity type, a place entity type, and a company entity type; and
a plurality of relationship types to interconnect the entity types comprising
an attendee of relationship type can be used to connect the person entity type to the cultural event entity type,
a performer at relationship type can be used to connect the person entity type to the cultural event entity type,
an award presented at relationship type can be used to connect the award entity type to the cultural event entity type,
a was held at relationship type can be used to connect the graduation ceremony event entity type to the place entity type,
a has as its subject relationship type can be used to connect the creative work entity type to the cultural event entity type, and
a sponsor of relationship type can be used to connect the company entity type to the cultural event entity type; and
a second ontology data model associated with donations comprising:
a plurality of entity types comprising a person entity type, a recipient organization entity type, and an organization entity type; and
a plurality of relationship types to interconnect the entity types comprising
a donor of relationship type can be used to connect the person entity type to the recipient organization entity type, and
the donor of relationship type can be used to connect the organization entity type to the recipient organization entity type.

13. The method of claim 1 comprising:
disallowing ghost nodes from being directly coupled to other ghost nodes or to system-provided nodes using ghost edges.

14. The method of claim 1 comprising:
disallowing system-provided nodes from being directly coupled to other system-provided nodes using ghost edges.

15. The method of claim 1 comprising:
disallowing ghost nodes from being directly coupled to other ghost nodes or to system-provided nodes using ghost edges; and
disallowing system-provided nodes from being directly coupled to other system-provided nodes using ghost edges.

16. The method of claim 1 wherein the ontology data model specifies a plurality of relationship types represented in the social graph, and each relationship type of the plurality of relationship types specify a first entity type, a second entity type, and an edge type, wherein the edge type couples an entity of the first entity type and a second entity of the second entity type,
each relationship type of the plurality of relationship types specify the first entity type represented as a first system-provided node, a second entity type represented by a second system-provided node, and an edge type represented by a system-provided edge, and
the ontology data model is disallowed from specifying ghost nodes and ghost edges to the social graph.

17. The method of claim 1 further comprising:
providing an user input component, wherein the user input component receives from a first user information associated with the first user including at least one relationship of the first user to at least one entity represented by a system-provided node in the social graph.

18. The method of claim 17 further comprising:
wherein the graph manager component creates a first ghost node representing the first user in the social graph,
identifies the first system-provided node matching the at least one relationship received from the first user, and
establishes a first ghost edge connecting the first ghost node and the first system-provided node.

19. The method of claim 18 wherein the first system-provided node of the social graph is directly coupled by the first ghost edge to the first ghost node and directly coupled by a first system-provided edge to a second system-provided node, wherein the second-system provided node is coupled to the first ghost node by two or more degrees of separation in the social graph.

20. The method of claim 18 wherein the first user is allowed to modify the first ghost node and disallowed to modify the first system-provided node.

21. A method comprising:
receiving unstructured information at a system;
providing an ontology data model comprising a plurality of entity types and plurality of relationship types, wherein the relationship types are used to interconnect the entity types;
based on the ontology data model, creating ontology data structures comprising:
identifying a first portion of the unstructured information as a first entity type;
identifying a second portion of the unstructured information as a second entity type; and
assigning a first relationship type to interconnect the first and second entity types;
storing the ontology data structures on a server;
providing a social graph, wherein the social graph comprises:
a plurality of nodes of a first type, referred to as system-provided nodes, wherein each system-provided node represents an entity tracked by the system and includes the unstructured information gathered by the system;
a plurality of nodes of a second type, different from the first type of node and referred to as ghost nodes, wherein each ghost node represents an entity created for a user of the system and includes information specified by the user of the system;
a plurality of edges of a first type, referred to as system-provided edges, wherein each system-provided edge represents a relationship between two different system-provided nodes of the social graph and includes a relationship type determined by the system; and
a plurality of edges of a second type, different from the first type of edge and referred to as ghost edges, wherein each ghost edge represents a relationship between a system-provided node and ghost node of the social graph, and information on the relationship is specified by a user of the system;
in the social graph, providing a first system-provided node of the first entity type and a second system-provided node of the second entity type;
updating the social graph based on the ontology data structures comprising creating a first system-provided edge coupling the first system-provided node to the second system-provided node to represent the first relationship type; and
providing a graphical user interface through which users can access the first and second system-provided nodes along with a visual indication of the first relationship type represented by the first system-provided edge.

22. The method of claim 21 wherein the ontology data model comprises:
an ontology data model associated with events comprising:
a plurality of entity types comprising an event entity type, a person entity type, a creative work entity type, a place entity type, a cultural event entity type, a graduation ceremony event entity type, and a company entity type; and
a plurality of relationship types to interconnect the entity types comprising
an attendee of relationship type can be used to connect the person entity type to the cultural event entity type,
a performer at relationship type can be used to connect the person entity type to the cultural event entity type,
a was held at relationship type can be used to connect the graduation ceremony event entity type to the place entity type,
a has as its subject relationship type can be used to connect the creative work entity type to the cultural event entity type, and
a sponsor of relationship type can be used to connect the company entity type to the cultural event entity type.

23. The method of claim 21 comprising:
an ontology data model associated with donations comprising:
a plurality of entity types comprising a person entity type, a recipient organization entity type, and an organization entity type; and
a plurality of relationship types to interconnect the entity types comprising
a donor of relationship type can be used to connect the person entity type to the recipient organization entity type, and
the donor of relationship type can be used to connect the organization entity type to the recipient organization entity type.

24. The method of claim 21 wherein the storing the ontology data structures on a server comprises:
storing the entity type identified from the unstructured information in a first table;
storing entries in a second table, wherein each entry comprises at least two entities and a relationship type associated with the two entities.

25. The method of claim 21 comprising:
providing a first entity on a second entity, wherein the first entity is connected to the second entity using a first relationship type;
providing second influence ranking of a third entity on the second entity, wherein the third entity is connected to the second entity using a second relationship type; and
determining an influence ranking of the first entity on the second entity relative to the third entity on the second entity based on a weighting of the first relationship type to the second relationship type.

26. The method of claim 21 wherein the identifying a first portion of the unstructured information as a first entity type comprises
using a metadata associated with the unstructured information to determine the first entity type.

27. The method of claim 12 comprising:
disallowing ghost nodes from being directly coupled to other ghost nodes or to system-provided nodes using ghost edges.

28. The method of claim 21 comprising:
disallowing system-provided nodes from being directly coupled to other system-provided nodes using ghost edges.

29. A method comprising:
providing a predefined ontology data model;
filtering through information using the predefined ontology data model at a system to obtain ontology data structures comprising entity types and relationship types that interconnect the entity types;
using a computer to store a social graph and ontology data structures, wherein the social graph comprises:
a plurality of nodes of a first type, referred to as system-provided nodes, wherein each system-provided node represents an entity tracked by the system and includes information gathered by the system;
a plurality of nodes of a second type, different from the first type of node and referred to as ghost nodes, wherein each ghost node represents an entity created for a user of the system and includes information specified by the user of the system;
a plurality of edges of a first type, referred to as system-provided edges, wherein each system-provided edge represents a relationship between two different system-provided nodes of the social graph and includes a relationship type determined by the system; and
a plurality of edges of a second type, different from the first type of edge and referred to as ghost edges, wherein each ghost edge represents a relationship between a system-provided node and ghost node of the social graph, and information on the relationship is specified by a user of the system;
based on the ontology data structures, providing a first system-provided node of a first entity type;
based on the ontology data structures, providing a second system-provided node of a second entity type;
based on the ontology data structures, providing a first system-providing edge coupling the first system-provided node to the second system-provided node; and
permitting users, each being represented by a ghost node in the social graph, to view, through a computer graphical user interface, a visual indication of a relationship between the first system-provided node and second system-provided node represented by the first system-provided edge.

30. The method of claim 29 comprising:
calculating an index value for each system-provided node, wherein the index value comprises a computation involving weightings of relationships between a system-provided node and other system-provided nodes coupled to the system-provided node, and the weightings are dependent on the predefined ontology data model.

31. The method of claim 29 comprising:
creating a first ontology data structure from the information, wherein the information is unstructured;
storing the first ontology data structure on the computer;
after the storing the first ontology data structure, receiving further information related to an entity of the first ontology data structure; and
after the receiving further information, updating the first ontology data structure by adding a new entity type and a new relationship type to the first ontology data structure.

32. The method of claim 29 comprising:
disallowing ghost nodes from being directly coupled to other ghost nodes or to system-provided nodes using ghost edges.

33. The method of claim 29 comprising:
disallowing system-provided nodes from being directly coupled to other system-provided nodes using ghost edges.

* * * * *